(12) United States Patent
Aidukas et al.

(10) Patent No.: US 12,333,748 B2
(45) Date of Patent: Jun. 17, 2025

(54) INDUSTRIAL METROLOGY OF WORKPIECE SURFACE BASED ON DEPTH MAP

(71) Applicants: Carl Zeiss Industrielle Messtechnik GmbH, Oberkochen (DE); Carl Zeiss Microscopy GmbH, Jena (DE)

(72) Inventors: Tomas Aidukas, Brugg (CH); Sören Schmidt, Jena (DE); Daniel Plohmann, Lauingen (DE)

(73) Assignees: Carl Zeiss Industrielle Messtechnik GmbH, Oberkochen (DE); Carl Zeiss Microscopy GmbH, Jena (DE)

( * ) Notice: Subject to any disclaimer, the term of this patent is extended or adjusted under 35 U.S.C. 154(b) by 409 days.

(21) Appl. No.: 17/709,323

(22) Filed: Mar. 30, 2022

(65) Prior Publication Data

US 2022/0319027 A1 Oct. 6, 2022

(30) Foreign Application Priority Data

Mar. 31, 2021 (DE) ..................... 10 2021 108 238.2

(51) Int. Cl.
*G06T 7/55* (2017.01)
(52) U.S. Cl.
CPC ...... *G06T 7/55* (2017.01); *G06T 2207/10028* (2013.01)
(58) Field of Classification Search
CPC . G06T 7/55; G06T 7/571; G06T 2207/10028; G06T 2207/30164;

(Continued)

(56) References Cited

U.S. PATENT DOCUMENTS

| 5,151,609 A | * | 9/1992 | Nakagawa | ............. G01B 11/24 250/559.22 |
| 2009/0088999 A1 | * | 4/2009 | Bryll | ................. G01B 11/0608 382/141 |
| 2020/0214811 A1 | | 7/2020 | Verker | |

FOREIGN PATENT DOCUMENTS

| DE | 10149357 A1 | 4/2002 |
| DE | 10237470 A1 | 4/2003 |

(Continued)

OTHER PUBLICATIONS

Partial European Search Report dated Jul. 29, 2022 for EP 22164926.

(Continued)

*Primary Examiner* — Vu Le
*Assistant Examiner* — Tracy Mangialaschi
(74) *Attorney, Agent, or Firm* — Miller Johnson

(57) ABSTRACT

A method for generating a depth map of a region of a surface of a workpiece includes receiving a stack of images. The images image the region of the surface of the workpiece with defined focal plane positions that are different in a depth direction and a focal plane position is assigned to each. Image points of the images are respectively assigned to a corresponding object point on the surface. The method includes determining a focus value of each image point of each image. The method includes fitting a function along the depth direction to the focus values of those image points that are assigned to the same object point. The method includes determining a depth value of each object point on the surface in the depth direction based on an extremum of the fitted function. The method includes generating the depth map based on the determined depth values.

26 Claims, 14 Drawing Sheets

(58) Field of Classification Search
CPC .... G01B 11/005; G01B 11/24; G01B 21/045; G02B 21/367; G02B 21/244
See application file for complete search history.

(56) References Cited

FOREIGN PATENT DOCUMENTS

| | | |
|---|---|---|
| DE | 102004047928 A1 | 4/2006 |
| DE | 60319095 T2 | 2/2009 |
| DE | 10201001760 A1 | 6/2010 |
| DE | 102010017604 A1 | 3/2011 |
| DE | 102015112651 B3 | 7/2016 |
| EP | 2598836 B1 | 6/2013 |
| EP | 2598836 A1 | 6/2014 |
| EP | 4227636 A1 | 8/2023 |
| WO | 2012013686 A1 | 2/2012 |

OTHER PUBLICATIONS

Yan Hongzhou et al: "The modified weighted gauss-fitting algorithm for structured-illumination microscopy", 2021 IEEE 5th Information Technology, Networking, Electronic and Automation Control Conference (ITNEC), IEEE, Bd. 5, Oct. 15, 2021 (Oct. 15, 2021).

Hongwei Guo: "A Simple Algorithm for Fitting a Gaussian Function [DSP Tips and Tricks]", IEEE Signal Processing Magazine, IEEE, USA, Bd. 28, Nr. 5, Sep. 2011 (Sep. 2011).

Nayar S K et al: "Shape From Focus", IEEE Transactions On Pattern Analysis and Machine Intelligence, IEEE Computer Society, USA, Bd. 16, Nr. 8, Aug. 1994 (Aug. 1994).

Extended European Search Report dated Nov. 21, 2022 for EP 22164926.

Helmli, Franz, Optical measurement of surface topography, Chapter 7: Focus variation instruments, Ed. by Richard Leach, Berlin, Springer, 2011. p. 131-166, ISBN 978-3-642-12011-4 (P), 978-3-642-12012-1 (E). DOI: 10.1007/978-3-642-12012-1_7. <https://link.springer.com/content/pdf/10.1007%2F978-3-642-12012-1.pdf> [retrieved on Apr. 29, 2021].

Nayar, Shree K, Proceedings 1992 IEEE Computer Society Conference on Computer Vision and Pattern Recognition, Shape from focus system, Jun. 15-18, 1992, Champaign, IL, USA, p. 302-308, ISBN 0-8186-2855-3. DOI: 10.1109/CVPR.1992.223259. <https://ieeexplore.ieee.org/stamp/stamp.jsp?tp=&arnumber=223259> [retrieved on Apr. 29, 2021].

German Patent and Trade Mark Office, Examination Report for DE App. No. 102021108238.2, mailed Dec. 9, 2021.

Communication received for EP22164926.2 dated May 28, 2024, 5 pages.

Blahusch et al., "Calibration of Curvature of Field for Depth From Focus," ISPRS Archives, vol. XXXIV, Part 3/W8, Munich, Sep. 17-19, 2003, 5 pages.

Franz Helmli, "Focus Variation Instruments," n: Leach, R. (eds) Optical Measurement of Surface Topography. Springer, Berlin, Heidelberg, 2011, https://doi.org/10.1007/978-3-642-12012-1_7, pp. 131-166.

DIN EN ISO 25178-606:2016, Geometrical product specification (GPS)—Surface texture: Areal—Part 606: Nominal characteristics of non-contact (focus variation) instruments (ISO 25178-606:2015); 36 pages Dec. 2016.

\* cited by examiner

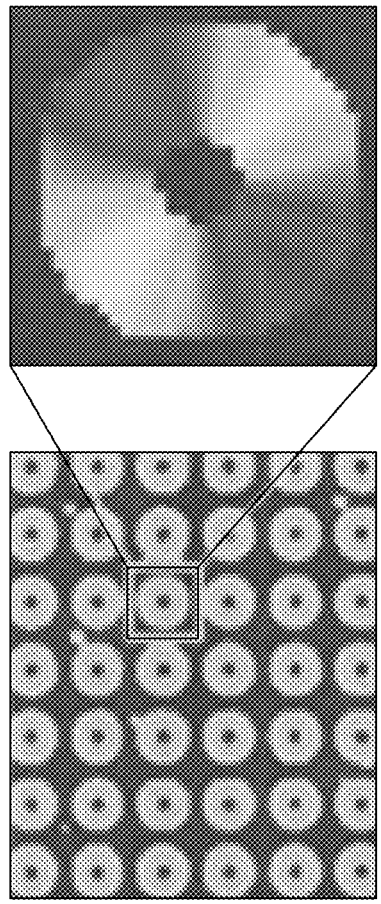
FIG. 13C
FIG. 13B
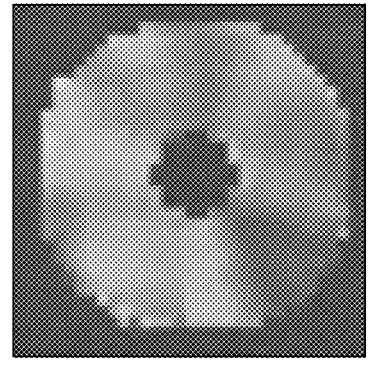
FIG. 13E
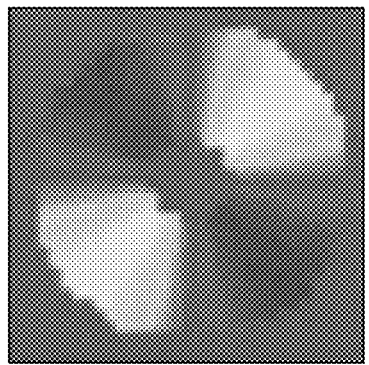
FIG. 13D
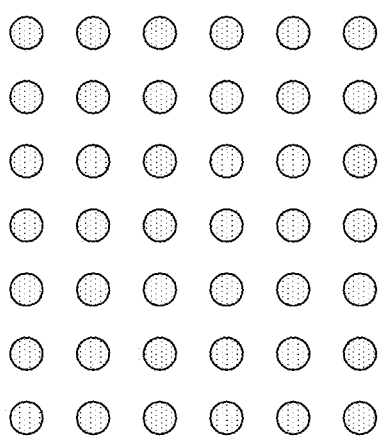
FIG. 13A

INDUSTRIAL METROLOGY OF WORKPIECE SURFACE BASED ON DEPTH MAP

CROSS-REFERENCE TO RELATED APPLICATIONS

This application claims priority to German patent application DE 10 2021 108 238.2 filed Mar. 31, 2021, the entire disclosure of which is incorporated by reference.

FIELD

The present disclosure relates to industrial metrology and more particularly to measurement of a workpiece surface.

BACKGROUND

The present disclosure relates to a computer-implemented method for generating a depth map of a region of a surface of a workpiece. Furthermore, the present disclosure relates to a method for measuring a surface of a workpiece with an optical sensor of a measuring apparatus. Furthermore, the present disclosure relates to a measuring apparatus, in particular a coordinate measuring machine or a microscope, for measuring a surface of a workpiece. Furthermore, the present disclosure relates to a computer program product.

A method of this type and an apparatus of this type are known from the document EP2 598 836 B1, for example.

Measuring apparatuses for measuring the surface of a workpiece, also called measurement object, are generally known in the prior art. Measuring apparatuses that can measure 3D information of a workpiece are required, in principle, in industrial metrology. For this purpose, in measuring apparatuses of this type, various types of sensors can be employed for capturing the coordinates of a workpiece to be measured.

By way of example, sensors that effect tactile measurement are known for this purpose. In this case, the surface of the workpiece to be measured is probed by a stylus, the coordinates of which in the measurement space are continuously known. Such a stylus can also be moved along the surface of a workpiece, and so in such a measuring process, in the context of a so-called "scanning method", a multiplicity of measurement points can be captured at defined time intervals.

Furthermore, optical measuring apparatuses are known, too, in which optical sensors are used. The optical sensors enable the coordinates of a workpiece to be captured without contact. In optical measuring apparatuses, the workpiece to be measured is clamped on a table as workpiece holder. In this case, the table forms an X-Y plane. Perpendicularly from the plane, i.e. in the Z-direction of a Cartesian coordinate system, the optical sensor is spaced apart from the workpiece to be measured.

Since conventional optical measuring apparatuses, such as microscopes or coordinate measuring machines, for example, can only record 2D data, the image depth or depth information in the Z-direction is determined by means of an additional technique.

By way of example, it is known to use sensors that effect tactile measurement together with optical sensors. However, tactile sensors have to be integrated together with the optical system in the measuring apparatus, with an increase in the costs and complexity of the measuring apparatus. Furthermore, the tactile sensor has to be in contact with the workpiece, which is not always desirable.

A non-invasive and expedient solution consists in determining the depth information in the Z-direction by means of optical measurements. Image unsharpness caused by optical defocusing changes in a predictable way. The optical system of the optical sensor has a focal plane, which is a plane of highest sharpness. If an object point lying on the surface of the workpiece is moved towards the focal plane, the imaging of the object point becomes sharper. If the object point is moved away from the focal plane, the imaging of the object point becomes less sharp. If the object point is arranged in the focal plane, the imaging of the object point is the sharpest. The image unsharpness can thus be supervised by varying the distance between the workpiece and the optical system. A focal image stack is generated by recording images while the workpiece is moved through the focus. On the basis of the focal image stack, depth information of the object points can be extracted by means of a technique that is called Shape from Focus (SFF).

The SFF technique has hitherto been known principally in connection with low-resolution measurement techniques, for example photography, where a visually satisfactory appearance of the 3D information is of primary importance. Therefore, most implementations of the SFF technique are not suitable for industrial metrology, where high reproducibility and high accuracy are required.

Methods that use the SFF technique are known in microscopy. By way of example, the document EP 2 598 836 A1 discloses a method for compensating for illumination deficiencies in microscopic "Shape from Focus (SFF)", which involves firstly estimating the reflectivity of the scene using a projector camera system and then applying the microscopic "Shape from Focus (SFF)" to a stack of reflection maps instead of to the original image data.

Furthermore, a method of this type is also described in the article "Shape From Focus System" by Shree K. Nayar, IEEE Conference on Computer Vision and Pattern Recognition (CVPR), 1992, 302-308, and also in the article "Focus Variation Instruments" by Franz Helmli, chapter 7 from the book "Optical Measurement of Surface Topography", pages 131-166, Springer Verlag.

SUMMARY

Against this background, it is a technical object of the present invention to provide a method for measuring a surface of a workpiece and a corresponding measuring apparatus by means of which a depth map of a region of the surface of the workpiece can be generated with high reproducibility and high accuracy.

In accordance with a first aspect of the invention, a computer-implemented method for generating a depth map of a region of a surface of a workpiece is provided, comprising the following steps:

receiving a focal image stack, wherein the focal image stack has a plurality of images of the workpiece, wherein the images image the region of the surface of the workpiece with defined focal plane positions that are different in a depth direction, wherein a focal plane position is assigned to each image of the focal image stack, wherein image points of the images are respectively assigned to a corresponding object point on the surface of the workpiece;

determining a focus value of each image point of each image of the focal image stack;

fitting a function along the depth direction to the focus values of those image points of the images which are assigned to the same object point;

determining a depth value of each object point on the surface of the workpiece in the depth direction on the basis of an extremum of the fitted function; and generating the depth map of the region of the surface of the workpiece on the basis of the determined depth values.

In accordance with a second aspect of the invention, a method for measuring a surface of a workpiece with an optical sensor of a measuring apparatus is provided, wherein the optical sensor and the workpiece are spaced apart from one another in a depth direction, comprising the following steps:

capturing a plurality of images of a region of the surface of the workpiece by means of the optical sensor, wherein the images each image the region of the surface of the workpiece with defined focal plane positions that are different in the depth direction, wherein each image point of each image is assigned to a corresponding object point on the surface of the workpiece, and wherein the captured images form a focal image stack;

generating a depth map of the surface of the workpiece by means of the method according to the first aspect of the invention.

In accordance with a third aspect of the invention, a measuring apparatus, in particular a coordinate measuring machine or a microscope, for measuring a surface of a workpiece is provided, wherein the measuring apparatus has a workpiece holder for the workpiece, an optical sensor and a control device, wherein the optical sensor is configured to capture images of a region of the surface of the workpiece, wherein the optical sensor and the workpiece are spaced apart from one another in a depth direction, wherein the control device is designed to carry out the following steps:

generating a depth map of the surface of the workpiece by means of the method according to the first aspect of the invention.

In this case, provision can be made for the control device furthermore to be designed to carry out the following steps, in particular before generating the depth map:

controlling the optical sensor in such a way that a plurality of images of a region of the surface of the workpiece are captured by means of the optical sensor, wherein the images each image the region of the surface of the workpiece with defined focal plane positions that are different in the depth direction, wherein each image point of each image is assigned to a corresponding object point on the surface of the workpiece, and wherein the captured images form a focal image stack.

In accordance with a fourth aspect of the invention, a computer program product comprising a computer program is provided which has program code means for carrying out a method according to the first aspect of the invention when the computer program is executed on a measuring apparatus. Furthermore, a computer program product can also be provided which comprises instructions which, when the program is executed by a computer, cause the latter to carry out the steps of the method according to the first aspect of the invention.

Advantageously, the novel method is implemented using a processing unit or a control device, which can be a multi-purpose computer or a special computer, wherein an appropriate computer program or computer program product is stored and executed, wherein the computer program or the computer program product is designed and configured for measuring the region of the surface of the workpiece and/or for generating the depth map in accordance with the methods mentioned above.

A workpiece should be understood to mean an object, in particular a measurement object, that is measured. The workpiece has a surface. Images of a region of the surface can be captured by an optical sensor of a measuring apparatus. The measuring apparatus can be in particular a coordinate measurement machine or a microscope. The optical sensor can have for example an image sensor and an optical system. The image sensor can be for example a charge-coupled semiconductor element sensor, also called CCD (charge-coupled device) sensor. The CCD sensor can be a monochrome sensor or a color sensor. The optical system can image the region of the surface of the workpiece on the image sensor. The optical system can have in particular an objective that is telecentric at least on the object side.

An image acquired by the optical sensor has a plurality of image points. Each image point images an object point of the region of the surface of the workpiece. The number of image points thus corresponds to the number of imaged object points. Present-day optical sensors can have resolutions of several megapixels. The number of image points of a captured image and accordingly also the number of imaged object points correspond to the number of pixels of the optical sensor. The captured images can thus have millions of image points.

During the process of capturing the images, the focal plane position of the optical sensor is varied in a depth direction relative to the workpiece in order to capture each image with a different, defined focal plane position.

Preferably, the optical sensor and the workpiece are movable relative to one another in the depth direction, such that a distance in the depth direction between the workpiece and the optical sensor is variable. By way of example, the measuring apparatus can have a drive device configured to move the optical sensor and the workpiece relative to one another in the depth direction. During the process of capturing the images, it is then possible to vary the distance between the optical sensor and the workpiece in the depth direction in order to vary the focal plane position for each image. The depth direction can be a Z-direction of a Cartesian coordinate system, wherein the captured images are an imaging of the region of the surface of the workpiece in the X- and Y-directions. In other words, the imaging of the images is perpendicular to the depth direction. In this case, the images are recorded at different, defined distances with respect to the workpiece. In this context, "defined" means that the distances at which the images are captured are stipulated and thus known in advance. By way of example, the images can be recorded in 50 µm steps.

Since the images are recorded from different distances with respect to the workpiece, the focal plane or the plane of highest sharpness of the optical sensor varies between the images. The optical setting of the optical sensor, in particular the focal distance of the objective, can remain constant in this case. Each image is captured with a different focal plane. The images thus jointly form a focal image stack. A defined distance is assigned to each image of the focal image stack. The distance of an image corresponds to a depth value in the depth direction, in particular a Z-position in the Z-direction. In other words, the captured images each image the region of the surface of the workpiece from different, defined distances with respect to the workpiece in a depth direction, wherein a distance is assigned to each image of the focal image stack.

Alternatively, during the process of capturing the images, the change in the focal plane position can be achieved by means of refocusing the optics or varying the focal distance of the objective of the optical sensor. That is to say that each focus setting at the objective is assigned a corresponding distance between the optical sensor and the set focal plane in the depth direction. In this way, the focal plane or the plane of highest sharpness of the optical sensor can be varied in an optical way between the images in order to form the focal image stack. The distance between the workpiece and the optical sensor can then remain constant.

Each image has the same number of image points. Each image point of an image images a corresponding object point of the workpiece from the region of the surface of the workpiece. Each image point of an image is thus assigned to a corresponding object point on the surface of the workpiece. An object point can also be referred to as a measurement point. Each object point on the surface of the workpiece has a position in the Cartesian coordinate system, in particular an X-position in the X-direction, a Y-position in the Y-direction and a Z-position in the Z-direction. The Z-position in the Z-direction can also be referred to as depth value in the depth direction. Since the captured images each image the same region of the surface of the workpiece, the image points of the images are assigned to the same object points. In particular, the image points of the images with the same X- and Y-coordinates are assigned to the same object point. This means that each object point is assigned a respective image point from each image.

The focal image stack is evaluated in order to generate the depth map. For this purpose, the focal image stack is firstly received in the novel method. The focal image stack, in particular the images of the focal image stack, can be preprocessed before being received or in the receiving step. By way of example, the images can be cropped, such that the image evaluation for generating the depth map takes place only in specific regions, in particular in the cut-out regions.

A focus value is then determined for each image point of each image of the focal image stack. The focus value indicates a measure of how sharply the respective image point is represented. By way of example, the brightness, a contrast value or a greyscale value of an image point can be considered for determining the focus value. In particular, a gradient of the brightness, of the contrast value or of the greyscale value with respect to the surrounding image points can be determined for determining the focus value. The greater the gradient, the sharper the image point and the greater the focus value.

In order to determine the depth value of an object point, the respective image points of the focal image stack which are assigned to the corresponding object point are considered jointly. Each of these image points is from different images in this case. Consequently, each image point is assigned a different distance and accordingly a different depth value in the depth direction. Determining the depth value of the object point then involves adapting a function in or along the depth direction to the focus values of the corresponding image points. The function can also be referred to as a sharpness function. As described in the introduction, the image sharpness is maximal when the object point lies in the focal plane of the optical sensor. If the distance with respect to the workpiece is shortened or lengthened, the image sharpness decreases. The focus value can be proportional or anti-proportional to the image sharpness. The depth value of the object point can thus be determined from the extremum of the function fitted to the focus values of the image points of a corresponding object point. Suitable functions are particularly those which are axially symmetrical with respect to an extremum, in particular with respect to a global extremum. The extremum can be a maximum or a minimum of the fitted function. The extremum is preferably a maximum of the fitted function if the focus value is proportional to the image sharpness. However, the extremum can also be a minimum of the fitted function if the focus value is anti-proportional to the image sharpness.

As soon as a depth value has been determined for each object point from the captured region of the surface of the workpiece, it is possible to generate a depth map of the region of the surface of the workpiece. The depth map represents a depth or height profile of the workpiece in the captured region. On the basis of the depth map and the focal image stack, it is then possible to generate an extended-depth-of-field (EDOF) image, which is an image of the region of the surface of the workpiece with an extended depth of field.

The drive device can set the distance between the workpiece and the optical sensor. For this purpose, the drive device can move the workpiece holder and/or the optical sensor in the depth direction. The drive device can have for example a piezoelectric drive, a direct drive or a spindle drive. A spindle drive is particularly suitable since it has a high resolution, can move large loads and has a large capture range in the depth direction.

The drive device and the optical sensor can be controlled by means of the control device of the measuring apparatus. For this purpose, the control device can have a regulating unit, for example, which can send control commands to the optical sensor and the drive device. The calculation steps for generating the depth map can likewise be carried out by means of the control device of the measuring apparatus. For this purpose, the control device can have a data processing unit, for example, which carries out the steps for generating the depth map.

The capability of acquiring highly accurate, 3D measured extended-depth-of-field (EDOF) images of an object depends on how the SFF algorithm is implemented. In particular, the accuracy of the 3D measurement depends on how the depth values of the depth map are determined on the basis of the focal image stack.

The images for the focal image stack are recorded using defined, for example discrete, distances, in particular steps, and the sharpness of each individual image point of the focal image stack is evaluated. Depth information for the workpiece is acquired by localizing the position of the sharpest image point in the focal image stack in the depth direction. The simplest way of generating the depth map would consist in assigning depth values to the indices of the focal image stack in the depth direction. In other words, for each object point it would be possible to determine the sharpest image point in the focal image stack and assign the corresponding depth value to the object point. However, depth maps of this type have a depth resolution that is fixed by the scanning, in particular the step size of the scanning, of the focal image stack. If the images are recorded in steps of 50 μm, for example, this then corresponds to the depth resolution as well.

As described in the introduction, the sharpness or intensity of each image point in the focal image stack is directly and predictably related to the unsharpness. The intensity of each image point changes according to how the image point is focused sharply or unsharply. In this case, the intensity profile in the depth direction follows a curve which has a maximum at the "sharpest point", and falls on both sides of the maximum. The sharpness of the image points of the focal image stack thus likewise follows a redimensioned curve of this type. By virtue of the fact that for each object point, then, a function is adapted to the corresponding image points in the depth direction, a more accurate depth value for the corresponding object point can be ascertained from the maximum of the function. In this way, it is possible to acquire a highly accurate depth map and to alleviate the restriction arising as a result of the scanning of a focal image stack.

In other words, it is possible as a result to generate a depth map of a region of the surface of the workpiece with high reproducibility and high accuracy and to measure the surface of the workpiece with high reproducibility and high accuracy.

In a first configuration, a depth value in the depth direction is assigned to each image of the focal image stack.

On the basis of the depth values of the images, it is possible to correspondingly fit the function for the image points of an object point and to determine the depth value for the corresponding object point. In this case, the depth value of the object point, in particular the z-position, results directly from the depth value at which the fitted function is extremal, preferably maximal. In particular, the depth values of the images can succeed one another in discrete steps. By way of example, the images can be recorded in 50 µm steps. This means that the distance of the images in the depth direction with respect to the workpiece changes by 50 µm from image to image, in particular becomes larger or smaller.

In a further configuration, the focus value of each image point is determined on the basis of a sharpness of the image point.

As already explained in the introduction, the focus value of an image point can be determined for example on the basis of a gradient with respect to the surrounding image points of the corresponding image.

Alternatively, the focus values of a plurality of image points, in particular of a group of image points, can be determined jointly. For this purpose, the image points can be divided for example into groups of, preferably adjacent, image points, wherein a common focus value can be determined for each group of image points.

In a further configuration, the function to be fitted is a Gaussian function, wherein the depth value of each object point corresponds to the expected value, also called median or central value, of the respective Gaussian function.

A Gaussian function has a global maximum in principle at its expected value. If a Gaussian function is thus adapted to the focus values of the image points of an object point, then the depth value of the object point can be determined on the basis of the expected value. Furthermore, the intensity profile or the sharpness profile in the depth direction substantially follows a Gaussian curve if the distance with respect to the workpiece is varied in the depth direction. Therefore, if a Gaussian curve is fitted to each point of the region to be imaged, in particular for each object point, the accuracy and reproducibility of the depth map can thus be improved further.

In a further configuration, parameters, in particular fitting parameters, of the Gaussian function are determined by way of a linear equation system $Ax=B$, wherein A is a 3×3 matrix representing the coefficients of the equation system (A is dependent on the number of images and the depth values of the images), B is a vector having the solutions of the equation system (B is dependent on the depth values of the images and the corresponding focus values of the respective image points), and x is a vector having the parameters to be determined (expected value, standard deviation, amplitude) of the Gaussian curve, wherein the depth value (expected value) is determined on the basis of the parameters.

In principle, the natural logarithm can be applied to the Gaussian function and the resulting equation can be represented in linearized form by linearized parameters. The parameters of the Gaussian function that are to be determined can be these linearized parameters. The expected value, the standard deviation and/or the amplitude can therefore be determined on the basis of the linearized parameters. In particular, the plurality of the captured images can comprise more than three images. In other words, the number of captured images forming the focal image stack can exceed three. Since a Gaussian function is representable by means of three parameters, the Gaussian function is overdetermined if more than three images are recorded. The least squares method can therefore be used for adapting or fitting the Gaussian function to the depth-dependent sharpness profile. Applying the least squares method to the abovementioned linearized equation with the linearized parameters yields the equation system $Ax=B$. This equation system is overdetermined. In this case, the matrix A is dependent on the number of corresponding image points and the depth values or distances of the respective image points. The number of image points assigned to the respective object point corresponds to the number of images of the focal image stack. Accordingly, the depth values or distances of the respective image points likewise correspond to the depth values or distances of the images of the focal image stack. The matrix A is thus the same for all object points. The solution vector B is dependent on the depth values or distances of the respective image points and the determined focus values of the respective image points. This linearized method for adapting/fitting the Gaussian curve, i.e. determining the parameters of the Gaussian function, is also called the Caruana method or Caruana algorithm. The parameters of the Gaussian function are thus determined by means of the Caruana algorithm.

In a further configuration, the parameters are determined by means of the following equation: $x=A^{-1}B$, in particular wherein $A^{-1}B$ corresponds to an optimization solution of an overdetermined equation system based on the least squares method.

In general it is known that, for fitting a function to measured data, the parameters of the function are determined by means of non-linear optimization methods. These solution methods are very time-consuming, however, and can last several hours, under certain circumstances. In industrial metrology it is desirable for the measurement results to be able to be provided not only highly accurately, but also in a relatively short time, in particular in a few seconds. By means of the linearization of the optimization problem according to the Caruana algorithm, it is possible to use extremely efficient numerical libraries for solution with the aid of least squares.

In a further configuration, the method furthermore comprises the following step:

correcting at least one imaging aberration of the images of the focal image stack in the depth map, wherein the at least one imaging aberration is a tilt aberration and/or an image field curvature aberration and/or an astigmatism aberration.

The correcting step is carried out in particular after the depth map has been generated or after all depth values of the object points have been determined. All optical systems have imaging aberrations, also referred to as optical aberrations, within the manufacturing tolerances. The aberrations lead to a systematic measurement error in the calculated depth values. Field curvature and astigmatism are particularly problematic since they distort the depth values of the depth map. The tilt aberration or inclination aberration can also assume a non-negligible magnitude and can thus be corrected. At least the first- and second-order aberrations in the aberration scheme according to Zernike can be taken into account and corrected. The proposed correction mechanism makes it possible to carry out a digital aberration correction, by means of which the accuracy of the depth map is increased further.

In a further configuration, for the purpose of correcting the tilt aberration, a first correction value is assigned to each point of the depth map, wherein the depth value of each point of the depth map is corrected by means of the corresponding first correction value.

The optical system can have for example an imaging aberration which causes the image representation of the workpiece to be represented in a tilted manner on the recording image sensor. The first correction value reproduces this tilting and makes it possible to correct the depth values of the depth map by computationally extracting the tilting. The correction of the respective depth value can be effected in particular by subtraction of the corresponding first correction value from the respective depth value. The first correction value can be in particular pre-calculated or predetermined. In this way it is possible to correct a tilt aberration in the depth values. By correcting the tilt aberration, the accuracy of the depth map is increased further.

In a further configuration, for the purpose of correcting the image field curvature aberration, a second correction value is assigned to each point of the depth map, wherein the depth value of each point of the depth map is corrected by means of the corresponding second correction value.

If the optics of the optical system have an image field curvature, the image is not generated on a plane, but rather on a curved surface. Therefore, there is a so-called positional aberration. The position of the beam intersection point along the optical axis is then dependent on the position of the image points, that is to say that an image field curvature value is assigned for each individual image point. The further away from the optical axis object and thus image points are, the more the image point is displaced in the axial direction, i.e. in the depth direction. In other words, the optical system can have an imaging aberration which causes the image representation of the workpiece to be represented in a curved manner on the recording image sensor. The second correction value reproduces this curvature and makes it possible to correct the depth values of the depth map by computationally extracting the curvature. The correction of the respective depth value can be effected in particular by subtraction of the corresponding second correction value from the respective depth value. The second correction value can be in particular pre-calculated or predetermined. In this way it is possible to correct an image field curvature aberration in the depth values. By correcting the image field curvature aberration, the accuracy of the depth map is increased further.

In a further configuration, for the purpose of correcting the astigmatism aberration, an angle map of the region of the surface of the workpiece is generated, wherein a third correction value and a fourth correction value are assigned to each point of the depth map, wherein the depth value of each point of the depth map is corrected on the basis of the third correction value, the fourth correction value and the angle map.

Astigmatism is an aberration of the "skew" rays. A skewly incident beam of rays is refracted to different extents in the meridional and sagittal planes. A lens is perspectively shortened in the direction of the meridional plane, which results in a shorter focal length than in the sagittal plane. In other words, astigmatism is direction-dependent, in particular dependent on directions of the edges in the imagings of the images. The astigmatism can be described for each point by means of an angle-dependent function, in particular model or fit function, with at least two parameters having the first and second correction values. In other words, the astigmatism model is an adaptation of the depth map deviation represented by way of the circle azimuth. In particular, the astigmatism can be modelled as a linear combination of two radially symmetrical sine functions. In this case, the third correction value corresponds to the coefficient in the first sine function and the fourth coefficient corresponds to the coefficient in the second sine function. Preferably, the two sine functions are shifted by $\pi/2$. The third correction value and the fourth correction value thus constitute two correction values in two mutually perpendicular directions. For the purpose of correcting the astigmatism, an angle map of the region of the surface of the workpiece is generated. The angle map is determined on the basis of an image gradient. The image gradient can be determined on the basis of an EDOF image or the entire or a part of the focal image stack of the region of the workpiece for each point. For this purpose, an image gradient is calculated for each point. The image gradient is determined from a change in brightness with respect to surrounding image points. The direction of the image gradient can be represented by means of an angle. Consequently, in the angle map, each point is assigned an angle indicating the direction of the image gradient. In other words, the angle map represents the corresponding angle of the image gradient for each point of the depth map. On the basis of this angle, for the purpose of correcting the depth value of the respective point of the depth map, it is then possible to calculate the proportion of the third and fourth correction values. The proportion of the third correction value can be determined in particular by the product of the third correction value and the sine of the angle of the respective point. Accordingly, the proportion of the fourth correction value can also be determined by the product of the fourth correction value and the cosine of the angle of the respective point. The correction of the respective depth value can be effected in particular by subtraction of the sum of the proportions of the third and fourth correction values from the respective depth value. The third correction value and the fourth correction value can be in particular pre-calculated or predetermined. In this way it is possible to correct an astigmatism aberration in the depth values. By correcting the astigmatism aberration, the accuracy of the depth map is increased further. Furthermore, it is also possible to use directional Sobel filters in order to generate a plurality of angle maps of the region. In this case, an averaged angle map can then be used in order to reduce or to eliminate noise or disturbances.

In a further configuration, the measuring apparatus has a workpiece holder, wherein the workpiece is arranged on the workpiece holder for measuring purposes.

The workpiece holder can be in particular a work table, a measuring table or an object stage. The workpiece holder is configured to hold the workpiece to be measured in a defined position during the measuring process. For this purpose, the workpiece holder can have a planar surface on the top side, for example, on which planar surface the workpiece can be arranged during the measuring process.

In a further configuration, the measuring apparatus has a drive device, wherein the drive device moves the optical sensor relative to the workpiece holder in the depth direction and/or moves the workpiece holder relative to the optical sensor in the depth direction in order to vary the distance between the workpiece and the optical sensor.

In other words, the drive device is configured to move the workpiece holder and the optical sensor relative to one another in order to vary the distance between the workpiece and the optical sensor. For this purpose, the drive device can either move the workpiece holder in the depth direction or move the optical sensor in the depth direction or move the workpiece holder and the optical sensor in the depth direction.

In a further configuration, the distance between the workpiece and the optical sensor is varied in discrete steps.

In this case, the distance can be increased or decreased step by step. By way of example, the distance can be varied in 50 μm steps.

In a further configuration, the measuring apparatus has an illumination device, wherein the method furthermore has the following step:

illuminating the workpiece by means of the illumination device during the process of capturing the images of the focal image stack.

The illumination device is used to illuminate at least the region of the surface of the workpiece. The reflected light is then used to generate an image in the optical sensor. In this way, the region of the workpiece can be illuminated uniformly and the depth values of the surface region can be determined with substantially the same accuracy. The illumination can be for example a coaxial illumination, a ring illumination, a dark field illumination, a diffuse illumination or a point source illumination. The illumination device can be in particular a monochromatic light source, for example a monochromatic laser. A monochromatic light source has the advantage that no chromatic aberrations can occur.

In a further configuration, the method furthermore has the following step:

determining the first correction value and/or the second correction value and/or the third and fourth correction values for each point of the depth map, wherein, before measuring the workpiece, a depth map of a calibration object, in particular of a point grid, is generated, wherein the respective correction value is determined on the basis of a deviation of the depth map with respect to a known surface profile of the calibration object.

The calibration object can also be referred to as a calibration mask. The calibration object preferably has round structures. In particular, the calibration object can be a point grid or a perforated mask. A point grid is a regular arrangement of points. In particular, a point grid is a geometric structure in which points are arranged at identical distances from one another in two or three spatial directions. In the case of two spatial directions, the points are perpendicular to one another. In the case of three spatial directions, the points are arranged in pairs at an angle of 60° with respect to one another. Each point of the point grid has a spatial extent and is preferably circular. Each point of the point grid can be imaged by a plurality of image points of a captured image. Each point has a planar surface. The surface profile of the point grid is thus already known in advance. In particular, the point grid can be arranged on the workpiece holder such that the points of the point grid lie in a horizontal plane. The first correction value can be determined on the basis of a tilting of the image representation of the point grid relative to a horizontal plane. The second correction value can be determined on the basis of a curvature of the image representation of the point grid relative to a horizontal plane. For the purpose of determining the third correction value and the fourth correction value, each point of the point grid is considered individually. The third and fourth correction values can then be determined on the basis of a deviation of the calculated depth profile relative to the actual depth profile of the respective point, which profile is a planar surface. Consequently, in advance, i.e. initially, a depth map of a point grid is used for determining at least one of the correction values. The process of generating the depth map of the point grid takes place in accordance with the process of generating the depth map of the workpiece, but without the step of correcting the imaging aberrations. Each correction value determined can be stored in particular in an electronic storage unit. The measuring apparatus can have this storage unit. Once the desired correction values have been determined, the workpiece can then be measured. In this case, the depth values of the depth map can be corrected by means of the correction values determined. In this way, the correction values can be determined in a simple manner.

In a further configuration, determining the first correction values has the following steps:

generating a first point cloud of all points of the point grid on the basis of mean values of the depth values of each individual point of the point grid;

fitting a plane through the first point cloud; and determining the first correction values on the basis of a tilt angle of a normal to the plane relative to the depth direction.

As already described above, each point of the point grid is imaged by means of a plurality of image points of a captured image. The depth values of each individual point can be segmented after the depth map of the point grid has been generated. In this case, firstly the points of the depth map are determined which respectively are assigned to and reproduce a point of the point grid. The corresponding depth values are then averaged in order to determine an averaged depth value for each point of the point grid. The influence of an astigmatism aberration on the depth values is removed by means of the averaging of the depth values. The averaged depth values are then used to generate the first point cloud. A plane is then fitted through the first point cloud. From this plane a normal can be determined. The tilt angle corresponds to an angle between the normal and the depth direction. For each point of the depth map, the first correction value is then determined on the basis of the tilt angle. In particular, the first correction values are determined in such a way that they effect a rotation of the depth map about the center point thereof counter to the tilt angle, the absolute value of the rotation angle of the rotation corresponding to the absolute value of the tilt angle. The first correction values thus correct the tilting of the imaging of an object by means of the optical sensor.

In a further configuration, determining the second correction values has the following steps:

generating a second point cloud of all points of the point grid on the basis of mean values of the depth values of each individual point of the point grid;

fitting a curved function to the second point cloud; and determining the second correction values on the basis of a curvature of the curved function.

As already described above, each point of the point grid is imaged by means of a plurality of image points of a captured image. The depth values of each individual point can be segmented after the depth map of the point grid has been generated. In this case, firstly the points of the depth map are determined which respectively are assigned to and reproduce a point of the point grid. The corresponding depth values are then averaged in order to determine an averaged depth value for each point of the point grid. The influence of an astigmatism aberration on the depth values is removed by means of the averaging of the depth values. The averaged depth values are then used to generate the second point cloud. A curved function is then fitted to the second point cloud. The curved function can be a convex function or a concave function. The curved function is preferably a polynomial function in which the depth values are defined as a function of the X-values in the X-direction and Y-values in the Y-direction. The curved function preferably has an extremum, in particular a maximum, in the center of the captured region, in particular in the center point of the depth map. In other words, the function curves outwards proceeding from the center point. From this function the curvature can then be determined. For each point of the depth map, the second correction value is then determined on the basis of the curvature. In particular, the second correction values are determined in such a way that they compensate for a curvature of the depth map around the center point thereof. The second correction values thus correct the curvature of the imaging of an object by means of the optical sensor.

In particular, before the determination of the second correction values, the depth values of the depth map can be corrected by means of the first correction values in order to computationally extract the tilting before determining the second correction value. The averaged depth values used for generating the second point cloud can then be determined on the basis of the corrected depth values of the corresponding points of the point grid.

In a further configuration, determining the third and fourth correction values has the following steps:
  determining the third correction value and the fourth correction value for each point of the point grid on the basis of a cost function between an astigmatism model and the depth values of the respective point; and
  interpolating the third and fourth correction values on the basis of the third and fourth correction values of each point of the point grid.

As already described above, each point of the point grid is imaged by means of a plurality of image points of a captured image. The depth values of each individual point can be segmented after the depth map of the point grid has been generated. In this case, firstly the points of the depth map are determined which respectively are assigned to and reproduce a point of the point grid. As already described above, the astigmatism model is an adaptation of the depth map deviation represented by way of the circle azimuth. The adapted fit function, described by the fit parameters, corresponds to the third correction value and to the fourth correction value of the respective point of the point grid. In particular, the astigmatism model can be a linear combination of two radially symmetrical sine functions. The cost function is then minimized according to the coefficients of the sine functions. The coefficients of the sine functions correspond to the third correction value and to the fourth correction value of the respective point of the point grid. Proceeding from the third and fourth correction values determined for each point of the point grid, the third and fourth correction values for each point of the depth map are determined by interpolation on the basis of the third and fourth correction values of each point of the point grid.

In particular, before determining the third and fourth correction values, the depth values of the depth map can be corrected by means of the first and second correction values in order to computationally extract a tilt aberration and an image field curvature aberration before the determination of the third and fourth correction values. The remaining error in the corrected depth values then corresponds to the astigmatism aberration to the greatest possible extent. On the basis of the corrected depth values of the corresponding points of the point grid, a third and fourth correction value can then be determined for each point of the point grid.

In a further configuration, the method furthermore has the following step:
outputting the depth map by means of an output device.

The output device can have a display, for example, wherein the depth map can be displayed on the display. Furthermore, the output device can be configured to output the depth map to an electronic storage device, to a further apparatus or to an external display. The electronic storage device can be for example a storage medium, in particular a hard disk, a flash memory or a cloud. The further apparatus can for example use the depth map to carry out further processes. The external display can be configured for example to display the depth map.

It goes without saying that the features mentioned above and those yet to be explained below can be used not only in the combination respectively indicated but also in other combinations or by themselves, without departing from the scope of the present invention.

BRIEF DESCRIPTION OF THE DRAWINGS

Exemplary embodiments of the invention are illustrated in the drawing and are explained in greater detail in the following description. In the figures:

FIGS. 13A-13E shows various views of points of the point grid for elucidating the steps of determining the correction values;

DETAILED DESCRIPTION

Figure 1:
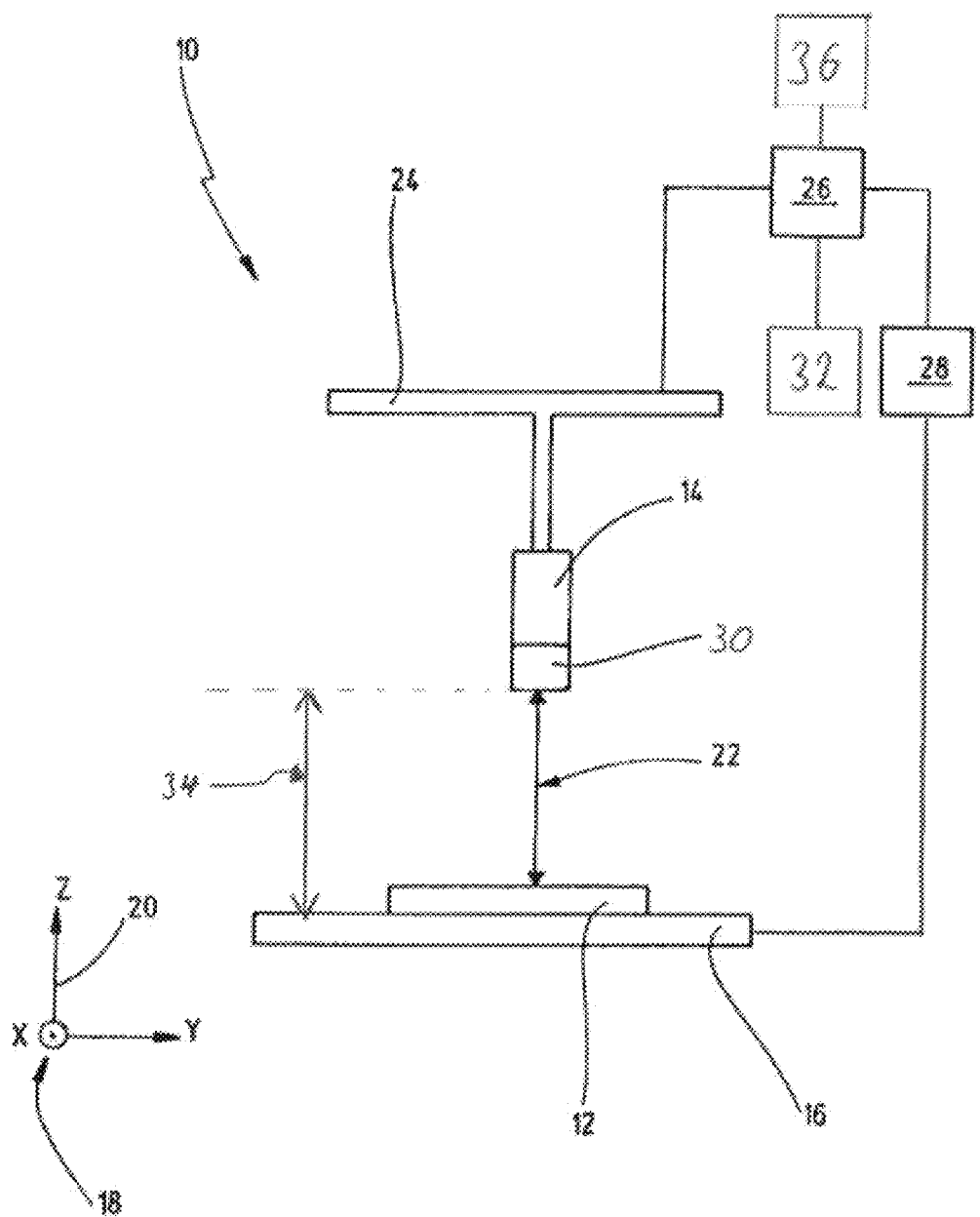
FIG. 1 shows a schematic view of a measuring apparatus.

FIG. 1 shows a measuring apparatus 10. The measuring apparatus can be a microscope or a coordinate measuring machine. The measuring apparatus 10 serves for measuring a workpiece 12. For this purpose, the measuring apparatus 10 has an optical sensor 14. In addition to the optical sensor 14, further sensors can be provided, of course, for example tactile sensors, but they are not illustrated in the present schematic view.

The optical sensor 14 can have an optical system 30 and an image sensor. The optical system 30 images a region of the surface of the workpiece 12 onto the image sensor. The optical sensor 14 can capture an image of the region of the surface of the workpiece 12 by means of the image sensor.

Furthermore, the measuring apparatus 10 can have an illumination device 32. The illumination device is configured to illuminate the at least one region of the surface of the workpiece 12.

The workpiece 12 to be measured is arranged on a workpiece holder 16. The workpiece holder 16 can be a measuring table, a work table or an object stage. In the illustrated view, the workpiece holder 16 is oriented in an X-Y-plane of a coordinate system 18. A Z-direction 20 extends perpendicularly to the workpiece holder 16. The Z-direction 20 is a depth direction. A distance between the optical sensor 14 and the workpiece 12 in the depth direction 20 is identified by a reference sign 22. A distance between the optical sensor 14 and the workpiece holder 16 in the depth direction 20 is identified by a reference sign 34. The optical sensor 14 and the workpiece holder 16 are movable relative to one another. The distance 34 can be varied in this way. Since the workpiece 12 is arranged on the workpiece holder 16, the distance 22 changes in accordance with the distance 34. In principle, for this purpose provision can be made for the workpiece holder 16 to be movable in the depth direction 20 and/or for the optical sensor 14 to be movable, for example by means of a suitable mechanism 24, in the depth direction 20.

The measuring apparatus 10 can furthermore have a drive device 28. The drive device 28 is configured to move the workpiece holder 16 and the optical sensor 14 relative to one another in the depth direction 20. Preferably, the drive device 28 is configured to move the workpiece holder 16 relative to the optical sensor 14 in the depth direction 20. Alternatively, the drive device 28 can also be configured to move the optical sensor 14 relative to the workpiece holder 16 in the depth direction 20. It goes without saying that the drive device 28 can also be configured to move both the optical sensor 14 and the workpiece holder 16 in the depth direction 20.

The measuring apparatus 10 furthermore has a control device 26. The control device 26 is configured to control the individual components of the measuring apparatus and to process data. For this purpose, the control device 26 can have various subunits, for example, each of which carries out control of a component and/or processing of data. By way of example, the control device 26 can have a regulating unit that controls the drive device 28, the optical sensor 14 and/or the illumination device 32. Furthermore, the control device 26 can have a data processing unit configured to carry out the evaluation of captured images of the optical sensor. The data processing unit can generate a depth map and/or an EDOF image of the workpiece 12 for example on the basis of a plurality of images forming a focal image stack.

The control device 26 can be connected to or have a non-volatile data memory with a computer program stored therein. In some exemplary embodiments, the control device 26 is a multi-purpose computer such as, for instance, a commercially available personal computer running under Windows®, Linux or MacOS, and the computer program from the memory has a program code designed and configured for implementing embodiments of the novel method in combination with the optical sensor 14 and the drive device 28. In an alternative exemplary embodiment, the control device 26 is a logic circuit such as, for instance, a field programmable gate array (FPGA), an application-specific integrated circuit (ASIC), a microcontroller or any other appropriate programmable electrical circuit. Therein it is possible to implement the embodiments of the novel method, in particular control and determination steps, with the logic circuit, such that the logic circuit is designed and configured for implementing embodiments of the novel method in combination with the optical sensor 14 and the drive device 28. For implementing embodiments of the novel method in the logic circuit, it is possible to use any appropriate programming language or hardware description language such as, for instance, C, VHDL and the like.

Furthermore, the measuring apparatus 10 can have an output device 36. The output device 36 is configured to output the depth map and/or the EDOF image of the workpiece 12. The output device 36 can have a display, for example, on which the depth map and/or the EDOF image of the workpiece 12 can be displayed. Alternatively or additionally, the output device 36 can be configured to output the depth map and/or the EDOF image of the workpiece 12 to an electronic storage device, to a further apparatus or to an external display.

Furthermore, the measuring apparatus 10 can also have an input apparatus, by means of which a user for example can input the number and distances or step size of the images to be captured into the coordinate measuring machine 10 or can manually move the optical sensor 14.

Before the workpiece is measured, provision can be made for a user to input the number of images to be captured and also the step size or distances 22 with which the images are intended to be captured. Alternatively, the number of images to be captured and also the step size or distances 22 with which the images are intended to be captured can be predefined or fixedly predetermined. For the purpose of measuring the workpiece 12, the control device 26 then controls the drive device 28 in such a way that the distance 22 between the workpiece 12 and the optical sensor 14 is varied in accordance with the presetting. At the same time the control device 26 controls the optical sensor 14 in such a way that a plurality of images of the region of the surface of the workpiece 12 are captured in accordance with the presetting while the distance 22 is varied. In this case, each image is captured at a different distance 22 with respect to the workpiece 12. The plurality of images then forms a focal image stack. The focal image stack is then evaluated by the control device 26 in order to generate the depth map of the region of the surface of the workpiece 12. An EDOF image can be generated on the basis of the depth map and the images of the focal image stack.

Figure 2:
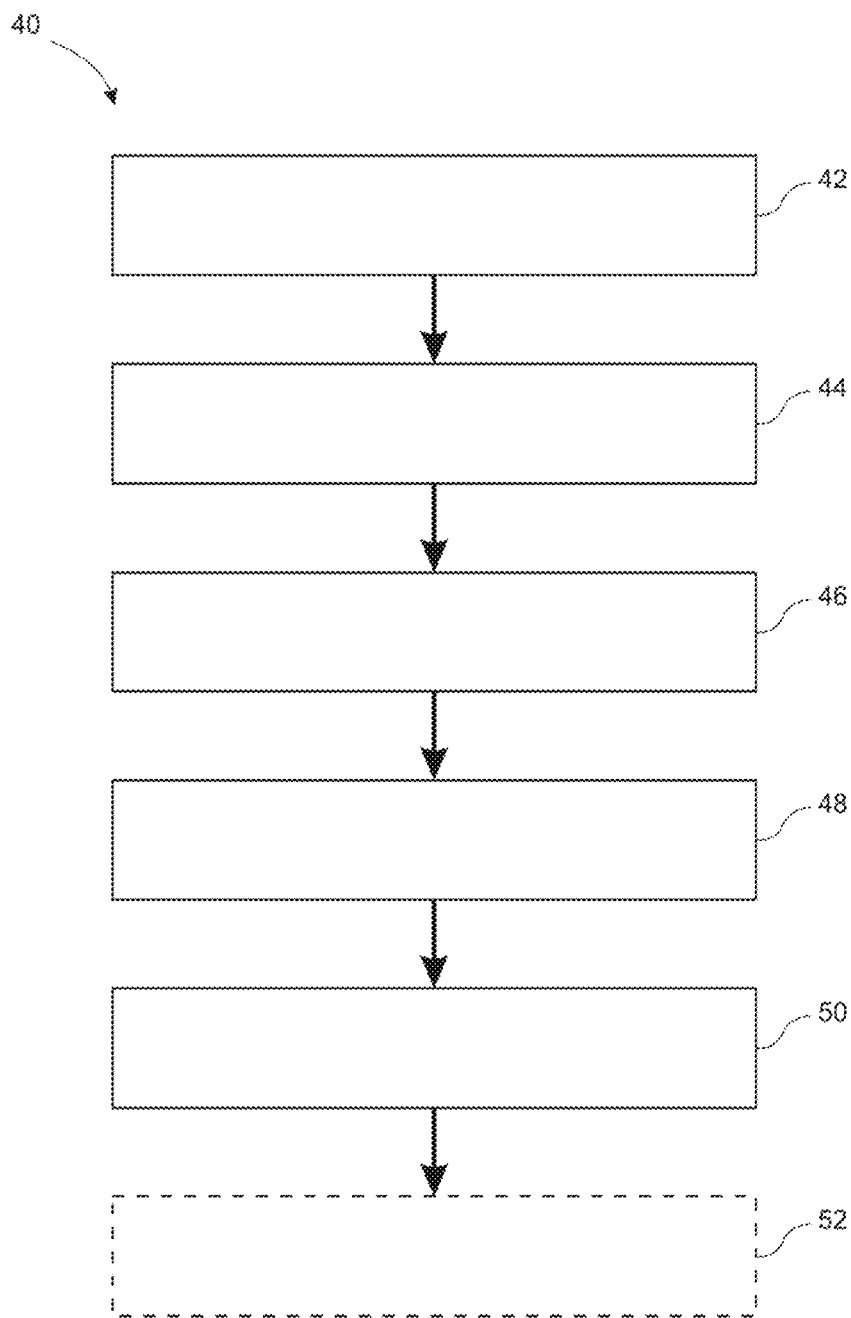
FIG. 2 shows a schematic view of a method for generating a depth map of a region of a surface of a workpiece.

FIG. 2 shows a computer-implemented method 40 for generating a depth map of a region of a surface of the workpiece 12. The method can be carried out by means of the control device 26, for example.

In a first step 42 of the method 40, a focal image stack is received. The focal image stack has a plurality of images of the workpiece 12, wherein the images image the region of the surface of the workpiece 12 with defined focal plane positions that are different in a depth direction, wherein a focal plane position is assigned to each image of the focal image stack. Each image has image points. The image points of the images are respectively assigned to a corresponding object point on the surface of the workpiece 12.

Preferably, the images each image the region of the surface of the workpiece 12 from different, defined distances 22 with respect to the workpiece 12 in the depth direction 20. In this case, a distance 22 is assigned to each image of the focal image stack. Since the images are captured at different distances 22 with respect to the workpiece 12 in the depth direction 20, a depth value in the depth direction 20 is assigned to each image of the focal image stack. In particular, the depth values of the images succeed one another in discrete steps.

Alternatively, the images each image the region of the surface of the workpiece 12 with different, defined focus positions, i.e. different focal image planes. In this case, each focus position or setting of the focal distance of the objective of the optical sensor can be assigned a depth value in the depth direction 20 that corresponds to the distance with respect to the focal plane in the respective focus position or setting. The distance between the optical sensor 14 and the workpiece 12 can remain constant in this case.

In a further step 44 of the method 40, a focus value of each image point of each image of the focal image stack is determined. The focus values of the image points are determined on the basis of a sharpness of each image point. For this purpose, for each image point a gradient of the brightness, of a greyscale value or of a contrast value with respect to the surrounding image points of the corresponding image is determined. In this way, a focus value is assigned to each image point of each image from the focal image stack. Since each image is assigned a depth value in the depth direction 20, accordingly each image point of the respective image is also assigned the same depth value. In other words, a depth value and a focus value are assigned to each image point.

A further step 46 of the method 40 involves fitting a function along the depth direction 20 to the focus values of those image points of the images which are assigned to the same object point. The function describes an assignment in which a corresponding focus value is assigned to each depth value in the depth direction. Preferably, the function is a Gaussian function. Alternatively, it is also possible to use other functions such as, for example, a parabolic function for fitting. Preferably, the function is axially symmetrical with respect to an extremum, in particular with respect to a maximum.

Figure 5:
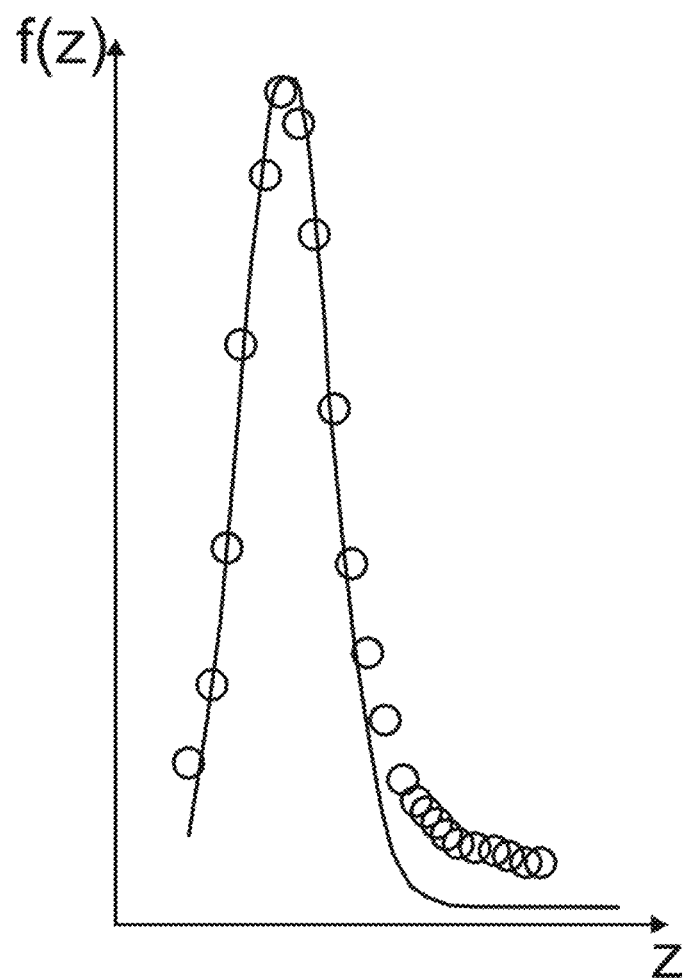
FIG. 5 shows a view of a diagram for illustrating the fitting of a function to determined focus values along the depth direction.

FIG. 5 illustrates by way of example a graph in which the focus values of image points of an object point are plotted along the depth direction 20, i.e. the Z-direction, and a fit function, preferably a Gaussian function, is fitted to these focus values.

In principle, the Gaussian function to be fitted can be represented by equation (1).

$$f(z) = k \exp \frac{-(z-\mu)^2}{2\sigma^2} \quad (1)$$

In this case, k is the amplitude, μ is the expected value and σ is the standard deviation of the Gaussian function. z is a depth value in the depth direction 20 corresponding to the Z-direction. f(z) thus represents the corresponding focus value in relation to the respective depth value.

The natural logarithm of equation (1) is represented in equation (2). Equation (2) can be represented in linearized form by means of linearized parameters a, b and c. The linearized form is represented in equation (3).

$$\ln f(z) = \ln k + \frac{-(z-\mu)^2}{2\sigma^2} \quad (2)$$

$$\ln f(z) = a + bz + cz^2 \quad (3)$$

The dependencies of the linearized parameters a, b and c on the expected value μ, the standard deviation σ and the amplitude k are defined in equations (4)-(6).

$$a = \ln k - \frac{\mu^2}{2\sigma^2} \quad (4)$$

$$b = \frac{\mu}{\sigma^2} \quad (5)$$

$$c = -\frac{1}{2\sigma^2} \quad (6)$$

In order to determine the parameters a, b, c proceeding from the linearized equation on the basis of the depth values z and focus values f(z) of the image points of the respective object point, the least squares method is employed. This results in the linear equation system of equation (7) with the variables A, x and B defined in equations (8)-(10).

$$Ax = B \quad (7)$$

$$A = \begin{bmatrix} N & \sum z & \sum z^2 \\ \sum z & \sum z^2 & \sum z^3 \\ \sum z^2 & \sum z^3 & \sum z^4 \end{bmatrix} \quad (8)$$

$$B = \begin{bmatrix} \sum \ln f(z) \\ \sum z \ln f(z) \\ \sum z^2 \ln f(z) \end{bmatrix} \quad (9)$$

$$x = \begin{bmatrix} a \\ b \\ c \end{bmatrix} \quad (10)$$

x is a vector having the linearized parameters a, b, c of the Gaussian curve. A is a 3×3 matrix specifying the coefficients of the equation system. B is a vector having the solutions of the equation system. N is the number of image points to which the function is fitted. This number corresponds to the number of images. The z-values are the depth values of these image points. As already described above, the depth value of an image point of an image corresponds to the depth value of the image. The function values f(z) are the focus values of these image points. The summation sign in the matrix A and the vector B means that summation over all the image points is effected.

The matrix A is thus dependent only on the depth values z of the images of the focal image stack and on the number N of images of the focal image stack. The matrix A is thus identical for each object point of the region of the surface of the workpiece 12. Only the solution vector B differs from object point to object point since the solution vector B is additionally also dependent on the respective focus values f(z) of the corresponding image points.

The linearized parameters a, b and c of the Gaussian function can be determined by way of the equation system of equation (7).

The expected value, the standard deviation a and the amplitude k of the Gaussian function can then be determined by means of equations (11)-(13) on the basis of the linearized parameters.

$$\mu = \frac{-b}{2c} \quad (11)$$

$$\sigma = \sqrt{\frac{-1}{2c}} \quad (12)$$

$$k = \exp\left(a - \frac{b^2}{4c}\right) \quad (13)$$

By forming the inverse of the matrix A, it is possible to determine the linearized parameters a, b and c by means of equation (14).

$$x = A^{-1}B \quad (14)$$

As already described in the introduction, present-day optical sensors have resolutions of several megapixels, the number of image points of each captured image and accordingly also the number of imaged object points corresponding to the number of pixels of the optical sensor. This results in millions of image points and respectively object points. The number of imaged object points is designated by M hereinafter. Since the fitting of a Gaussian function is carried out for each object point, this is a computationally intensive task.

A sparse block matrix can be generated in order to simplify the calculation, the sparse matrix being a 3M×3M matrix. The block matrix $A_{block}$ is defined in equation (15).

$$A_{block} = \begin{bmatrix} A_{1,1} & \cdots & 0 \\ \vdots & \ddots & \vdots \\ 0 & \cdots & A_{x,y} \end{bmatrix} = \begin{bmatrix} A_1 & \cdots & 0 \\ \vdots & \ddots & \vdots \\ 0 & \cdots & A_M \end{bmatrix} \quad (15)$$

Each 3×3 block along the diagonal contains a 3×3 matrix A, that describes the linear equation system for a respective object point. By means of single inversion of the block matrix $A_{block}$, it is possible to determine the Gaussian parameters for each object point of the region of the surface of the workpiece 12 in a computationally efficient manner.

A further step 48 of the method 40 involves determining the depth value of each object point on the surface of the workpiece 12 in the depth direction 20 on the basis of an extremum, in particular a maximum, of the fitted function. If the function to be fitted is a Gaussian function, the depth value of each object point corresponds to the expected value of the respective Gaussian function. The linearized parameters can then be determined by means of equation (14), the depth value of the object point then being determined by means of equation (11).

The fitting of a function is repeated for each object point, such that for each object point it is possible to determine a corresponding depth value on the basis of the extremum, in particular the maximum, of the respective function.

A further step 50 of the method 40 involves generating a depth map of the region of the surface of the workpiece 12 on the basis of the determined depth values of each object point. An EDOF image can then be generated on the basis of the generated depth map and the images of the focal image stack.

A further, optional step 52 of the method 40 involves correcting at least one imaging aberration of the images of the focal image stack in the depth map. By way of example, a tilt aberration, an image field curvature aberration and an astigmatism aberration can be corrected. For this purpose, the depth values of the depth map are corrected before the process of generating 50 the depth map or after the process of generating the depth map.

For the purpose of correcting the tilt aberration, a first correction value is assigned to each point of the depth map, wherein the depth value of each point of the depth map is corrected by means of the corresponding first correction value. The correction of the respective depth value is effected by subtraction of the corresponding first correction value from the respective depth value. The first correction value can be pre-calculated or predetermined.

For the purpose of correcting the image field curvature aberration, a second correction value is assigned to each point of the depth map, wherein the depth value of each point of the depth map is corrected by means of the corresponding second correction value. The correction of the respective depth value is effected by subtraction of the corresponding second correction value from the respective depth value. The second correction value can be pre-calculated or predetermined.

The correction of the astigmatism aberration is more complex than the correction of the tilt aberration and the image field curvature aberration and cannot be carried out simply by subtraction of a single correction value. This is owing to the fact that astigmatism is dependent on the edge direction. In other words, the astigmatism aberration is angle-dependent. This necessitates determining an angle map for the region of the surface of the workpiece 12, on the basis of which angle map the astigmatism aberration can be corrected.

Figure 12:
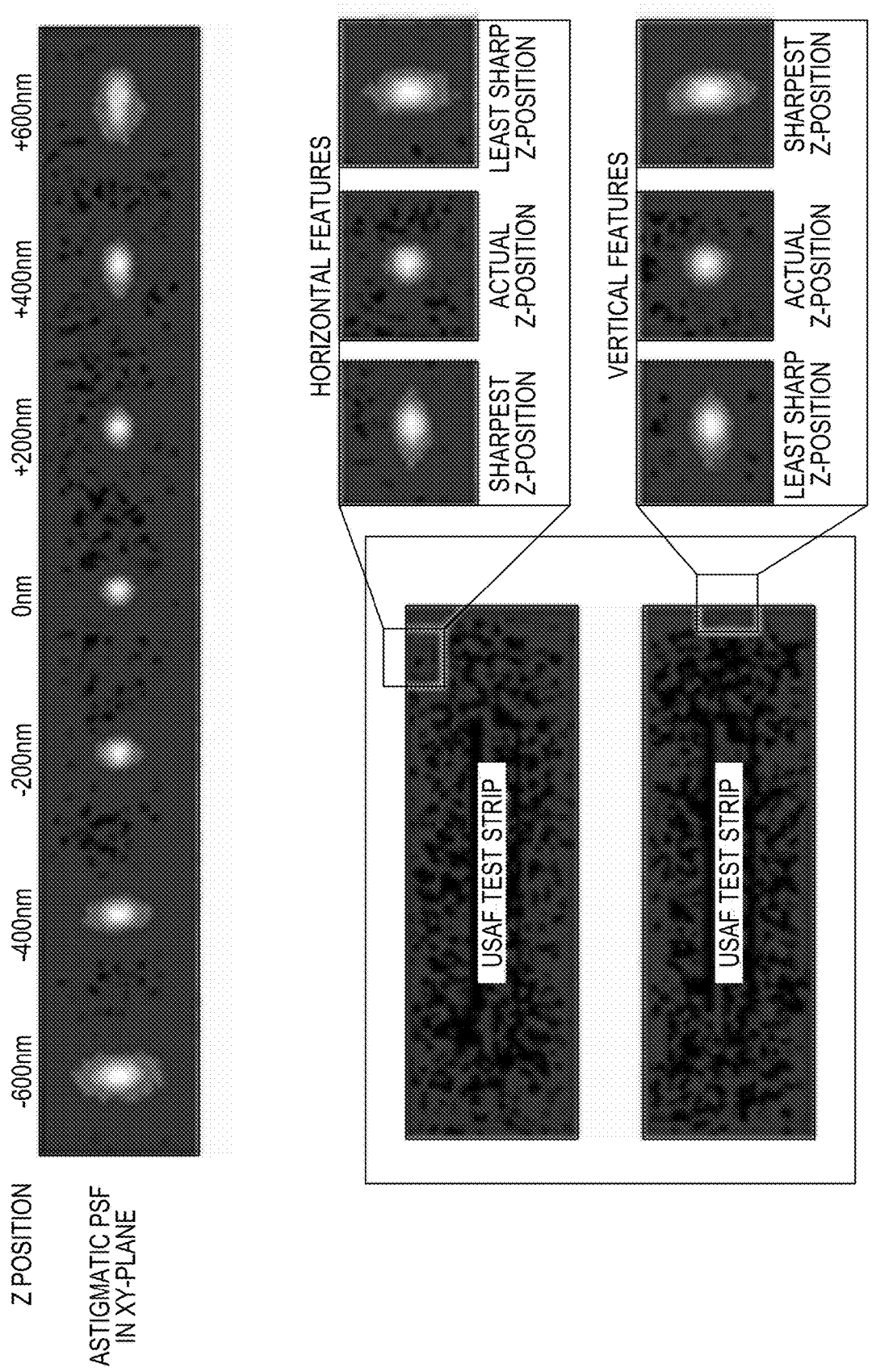
FIG. 12 shows an exemplary view for illustrating astigmatism.

In order to elucidate the angle dependence, the illustration in FIG. 12 is considered below. Astigmatism is an aberration of the "skew" rays. A skewly incident beam of rays is refracted to different extents in the meridional and sagittal planes. A lens is perspectively shortened in the direction of the meridional plane, also called transverse plane, which results in a shorter focal length than in the sagittal plane. Therefore, sagittal and transverse rays have their focal point at different distances along the optical axis, i.e. in the depth direction. These focal points are called transverse focal point and sagittal focal point. In the case of astigmatism, therefore, a point of an object which does not lie on the optical axis is not imaged sharply. Instead, sharp lines or ovals are formed at the sagittal and transverse focal points. A round, unsharp image is formed between these two focal points. Circles with the optical axis as the center or lines or edges that are tangential to such circles are imaged sharply at the transverse focal point. Lines or edges that run in a radial direction are imaged sharply at the sagittal focal point.

This is demonstrated in FIG. 12 on the basis of the example of a rectangular test strip of a USAF resolution test chart. The edges of the test strip run in two directions arranged perpendicular to one another. The image points of the horizontal edge and of the vertical edge are not sharply focused at the actual distance (z-position) with respect to the test strip. Instead, one edge (the vertical edge in the example in FIG. 12) is sharply focused at a smaller distance than the actual distance, whereas the other edge (the horizontal edge in the example in FIG. 12) is sharply focused at a larger distance than the actual distance. In other words, astigmatism results in an offset in the depth direction, the direction of the offset being dependent on the orientation of the edge, i.e. the angle.

In order to correct the astigmatism aberration, at each point of the depth map this aberration can be split into two portions corresponding to two perpendicular directions in the X-Y plane, in particular into a horizontal portion and a vertical portion. A third correction value and a fourth correction value can then be assigned to each point of the depth map. The astigmatism can be modelled as a fit of a height deviation relative to an azimuthally varying edge ($z=f(\Theta)$). In particular, the astigmatism can be modelled as a linear combination of two radially symmetrical sine functions. The sine functions are functions of an angle in the X-Y plane. Preferably, the two sine functions are shifted by $\pi/2$. In particular, the first sine function is a sine and the second sine function is a cosine. In this case, the third correction value corresponds to the coefficient in the first sine function and the fourth coefficient corresponds to the coefficient in the second sine function. The third correction value and the fourth correction value thus constitute two correction values in two mutually perpendicular directions. The astigmatism can be modelled in particular with the formula $\alpha \sin \Theta + \beta \cos \theta$, where $\alpha$ is the third correction value, $\beta$ is the fourth correction value and $\theta$ is an angle in the X-Y plane.

In order to correct the astigmatism aberration in the depth map in step 52 of the method 40, firstly an angle map is generated for the region of the surface of the workpiece 12. In order to generate the angle map, firstly an EDOF image of the captured region of the point grid is considered. The EDOF image can be generated for example on the basis of the depth map and the images of the focal image stack of the point grid. In the EDOF image, an image gradient can then be determined for each point. The image gradient is determined from a change in brightness with respect to surrounding image points. The direction of the image gradient can be represented by means of an angle. This angle specifies a direction in the X-Y plane. In this way, an image gradient and a corresponding angle can be determined for each point of the EDOF image. The angles determined then form the angle map. In other words, the angle map represents the corresponding angle of the image gradient for each point of the depth map. Furthermore, directional Sobel filters can also be used in order to generate a plurality of angle maps of the region. In this case, an averaged angle map can then be used in order to reduce or to eliminate noise or disturbances.

The depth value of each point of the depth map can then be corrected on the basis of the third correction value, the fourth correction value and the angle map. Since the angle $\theta$ is determined from the angle map for each point of the depth map, an effective correction value can thus be calculated for each point of the depth map by means of the formula $\alpha \sin \theta + \beta \cos \theta$. The correction of the respective depth value is then effected by subtraction of the corresponding effective correction value from the respective depth value of the depth map.

The correction values for correcting the respective imaging aberrations can be determined in advance as described below in FIG. 4.

Figure 3:
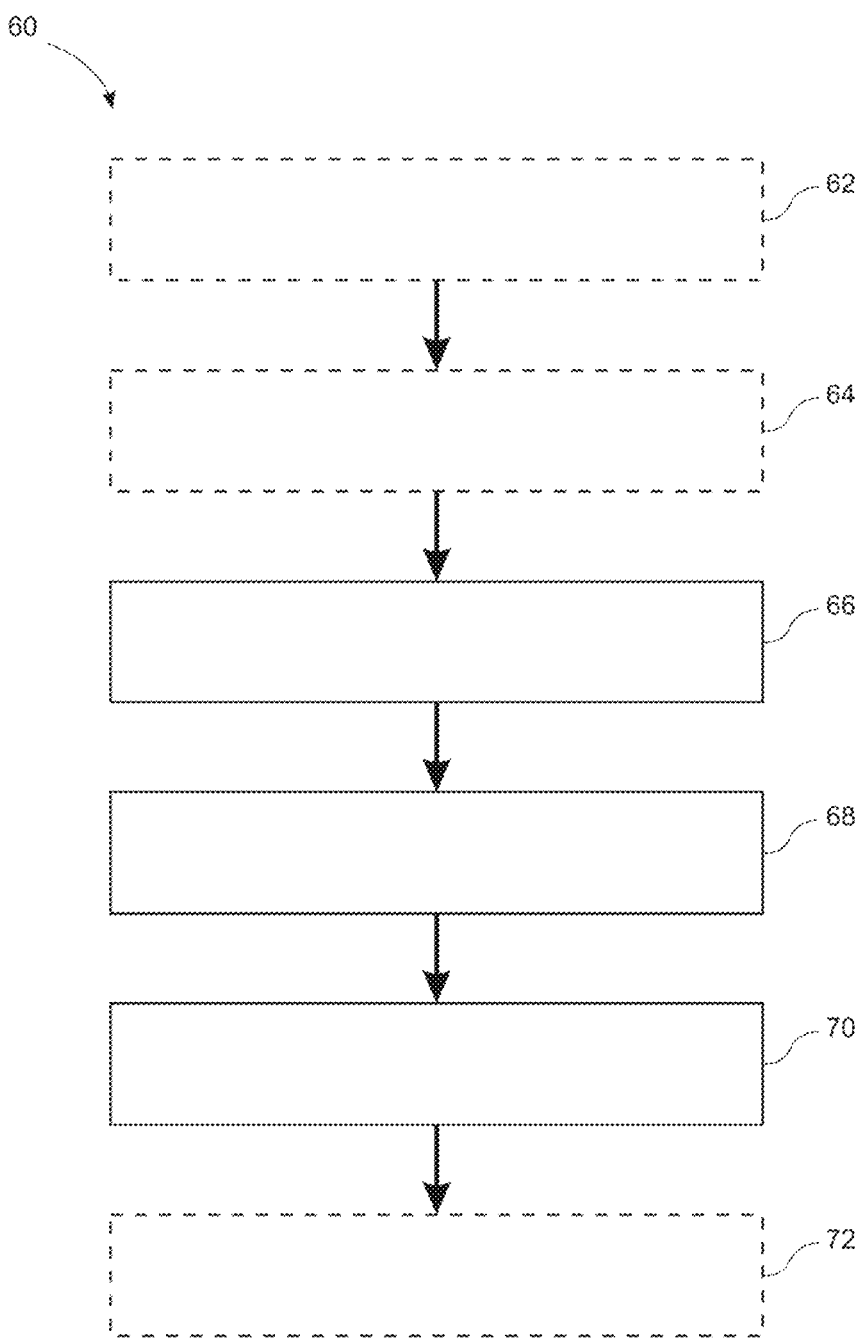
FIG. 3 shows a schematic view of a method for measuring a surface of a workpiece.

FIG. 3 shows a method 60 for measuring a surface of the workpiece 12 with the optical sensor 14 of the measuring apparatus 10. The workpiece is arranged on the workpiece holder for measuring purposes. The optical sensor 14 can then capture a region of the surface of the workpiece 12. The optical sensor 14 and the workpiece 12 are movable relative to one another in a depth direction 20, such that the distance 22 in the depth direction 20 between the workpiece 12 and the optical sensor 14 is variable.

In a step 66 of the method 60, the distance 22 between the workpiece and the optical sensor is varied. For this purpose, the drive device can move the optical sensor 14 relative to the workpiece holder 16 in the depth direction 20 and/or move the workpiece holder 16 relative to the optical sensor 14 in the depth direction 20 in order to vary the distance 22 between the workpiece 16 and the optical sensor 14. In particular, the distance 22 can be varied in discrete steps, for example in steps of 50 µm.

A further step 68 of the method 60 involves capturing a plurality of images of a region of the surface of the workpiece by means of the optical sensor while the distance 22 between the workpiece and the optical sensor is varied, wherein the images each image the region of the surface of the workpiece 12 from different, defined distances 22 with respect to the workpiece 12 in the depth direction 20, wherein each image point of each image is assigned to a corresponding object point on the surface of the workpiece 12, and wherein the captured images form a focal image stack.

In a further step 70 of the method 60, a depth map of the region of the surface of the workpiece 12 is generated by means of the method from FIG. 2. Furthermore, an EDOF image can also be generated on the basis of the generated depth map and the images of the focal image stack.

In a further optional step 72 of the method 60, the generated depth map is output by means of the output device 36. Alternatively or additionally, the output device 36 can also output the generated EDOF image.

In a further optional step 64 of the method 60, the workpiece 12 is illuminated by means of the illumination device 32 during the process of capturing the images of the focal image stack.

Figure 6:
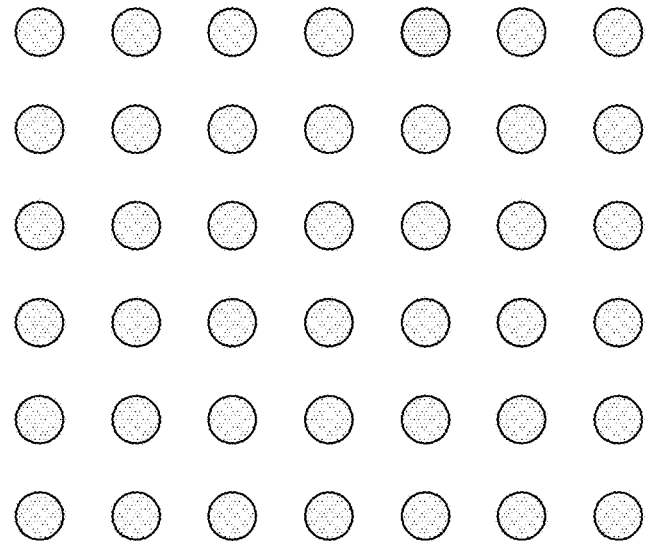
FIG. 6 shows an exemplary view of a calibration object.

In a further optional step 62 of the method 60, at least one of the correction values of the imaging aberrations is determined. For this purpose, before measuring the workpiece, in particular before steps 62 to 72, a depth map of a calibration object, in particular of a point grid, is generated. The depth map of the calibration object is generated according to steps 62 to 70 with a calibration object as workpiece, no correction of imaging aberrations being performed during the process of generating the depth map of the calibration object. FIG. 6 shows an exemplary illustration of a calibration object in the form of a point grid. Since the surface profile of the calibration object is known, the at least one of the correction values is then determined on the basis of deviations of the depth map with respect to the known surface profile of the calibration object.

Step 62 should thus be understood as a calibration step in which systematic measurement errors of the optical sensor are determined and corresponding correction values are ascertained. In this case, a point grid is used for calibration purposes.

Figure 4:
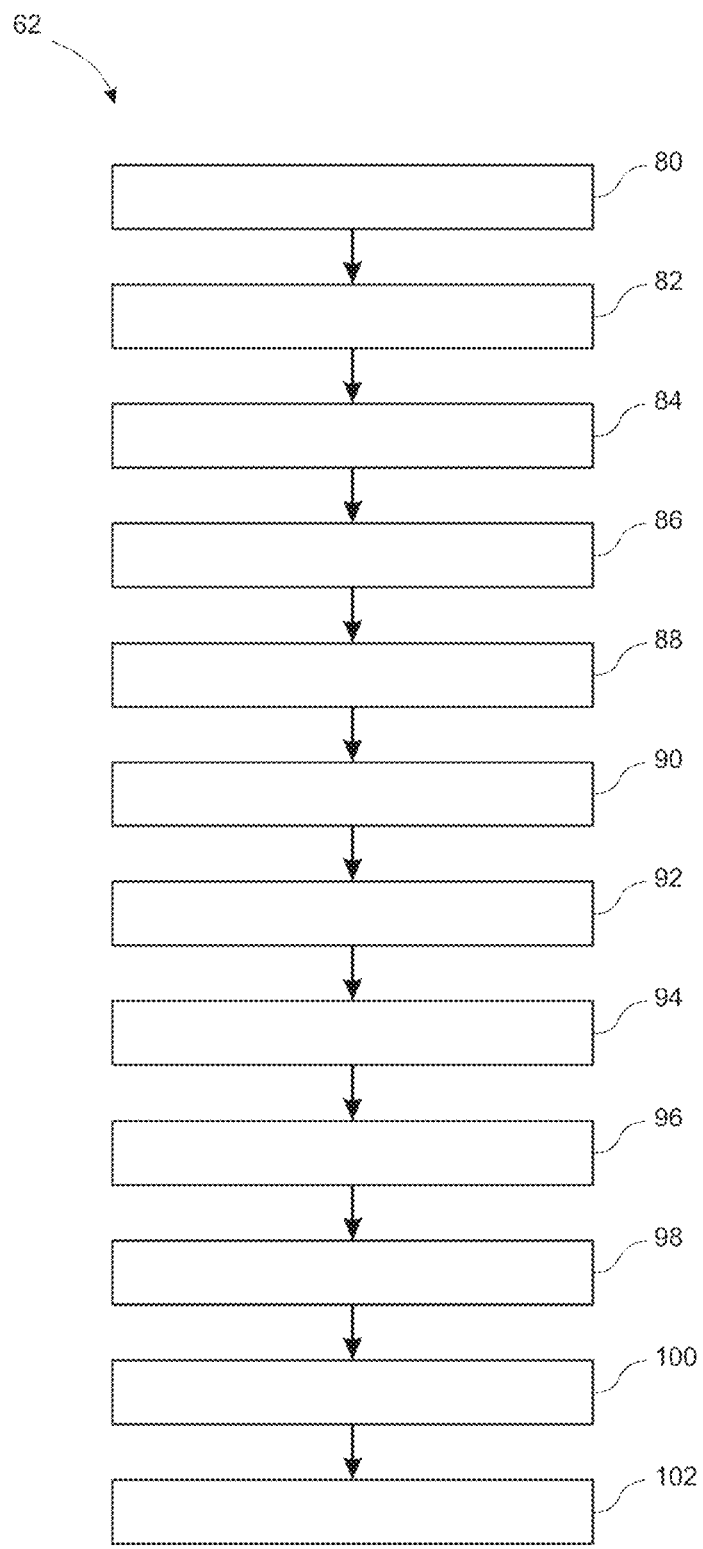
FIG. 4 shows a schematic view of method steps for determining correction values.

FIG. 4 shows method steps used to determine the correction values in step 62 of the method 60.

Figure 7A:
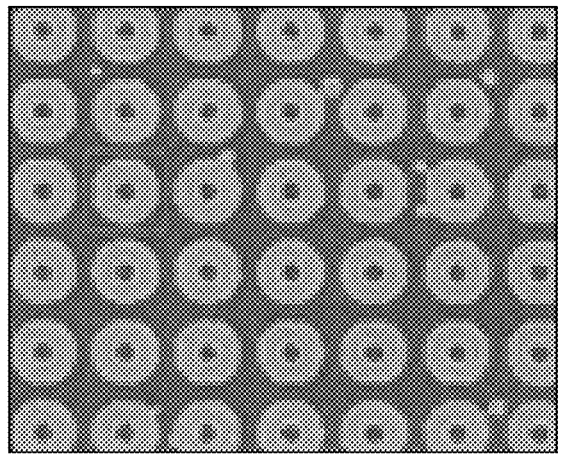
FIGS. 7A-7B shows views of segmented depth values of points of the point grid.
Figure 7B:
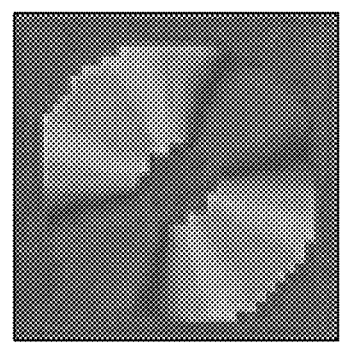

In a first step 80, the depth map of the point grid is generated. The depth map of the point grid is generated according to steps 62 to 70 with a point grid as workpiece 12, no correction of imaging aberrations being performed during the process of generating the depth map of the point grid. An exemplary illustration of a depth map of a point grid is illustrated in depiction (A) in FIG. 7. An EDOF image of the captured region of the surface of the point grid can additionally be generated on the basis of the depth map and the focal image stack of the point grid.

In a further step 82, the depth values of each individual point of the point grid are segmented. For segmentation purposes it is possible to use a Hough transformation, by means of which circles can be recognized. The Hough transformation can be applied to the EDOF image, for example, in order to detect the position of the individual points of the point grid. This is illustrated for one point of the point grid by way of example in depiction (B) in FIG. 7.

In a further step 84, a mean value of the depth values of the respective point of the point grid is determined. In other words, an averaged depth value is determined for each point of the point grid.

Figure 8:
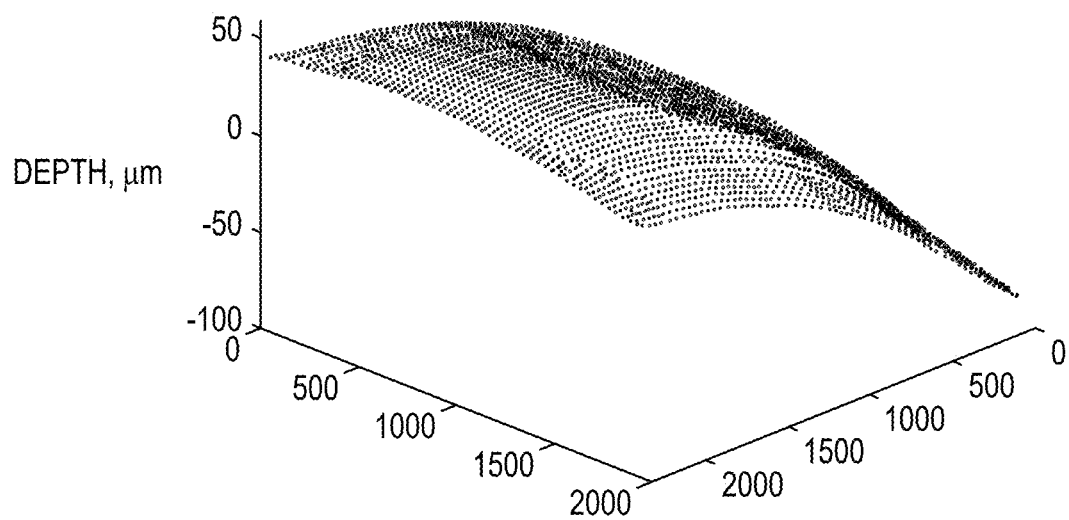
FIG. 8 shows a view of a diagram of a first point cloud.

In a further step 86, a first point cloud of the points of the point grid is generated on the basis of the determined mean values of the depth values of the points of the point grid. An exemplary illustration of a first point cloud of a point grid is illustrated in FIG. 8.

Figure 9:
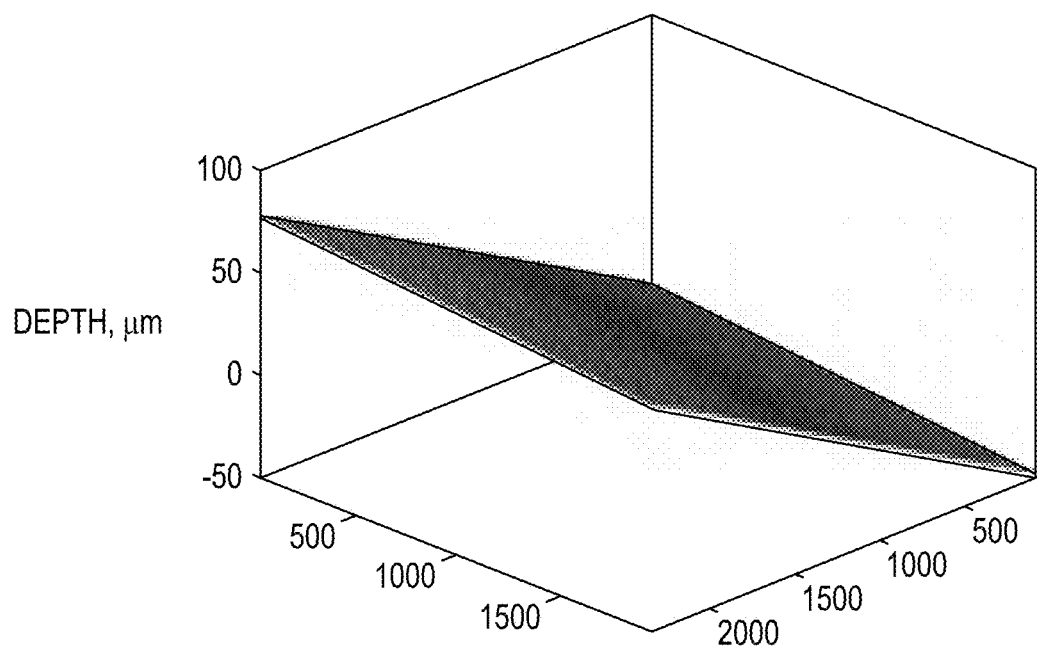
FIG. 9 shows a view of a diagram of a plane fitted to the first point cloud.

In a further step 88, a plane is fitted to the first point cloud. An exemplary illustration of a plane fitted to the first point cloud from FIG. 8 is illustrated in FIG. 9.

A further step 90 involves determining the first correction values on the basis of a tilt angle of the normal to the plane relative to the depth direction. In other words, each first correction value is determined on the basis of a deviation of the fitted plane relative to a horizontal plane, the normal to which is perpendicular to the depth direction.

Figure 10:
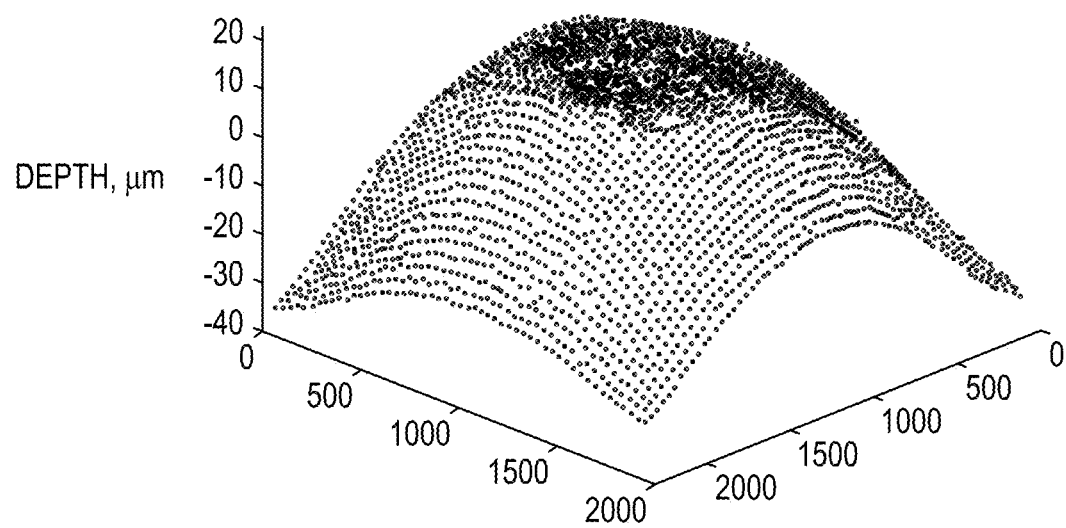
FIG. 10 shows a view of a diagram of a second point cloud.

A further step 92 involves generating a second point cloud of the points of the point grid on the basis of the determined mean values of the depth values of the points of the point grid and the first correction values determined previously, wherein the mean values of the points of the point grid are corrected by means of the first correction values. An exemplary illustration of a second point cloud of the point grid is illustrated in FIG. 10.

Figure 11:
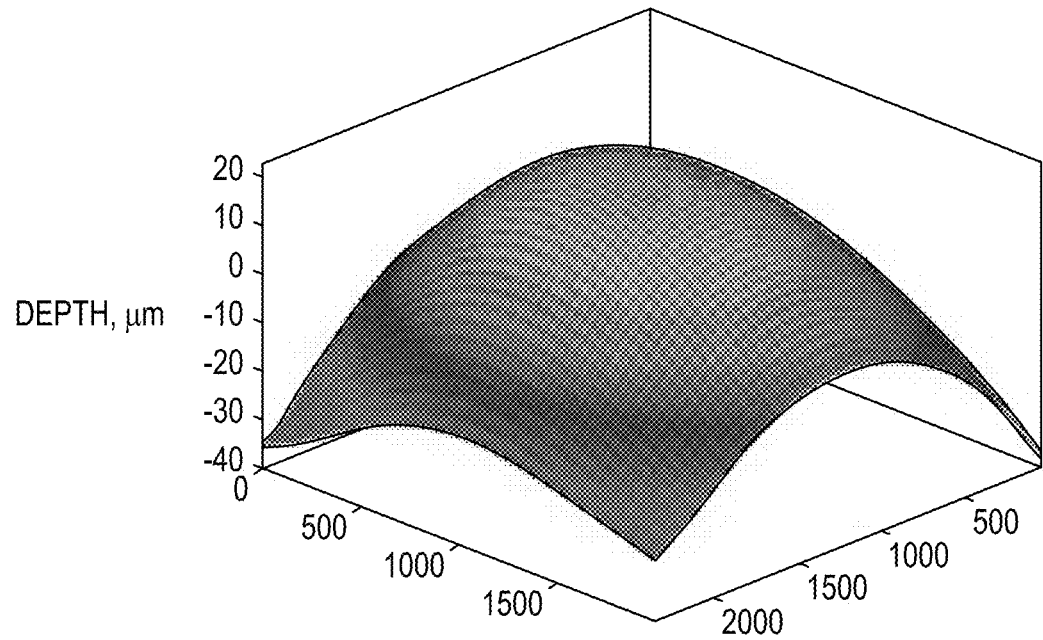
FIG. 11 shows a view of a curved function fitted to the second point cloud.

In a further step 94, a curved function is fitted to the second point cloud. The curved function can be a convex function or a concave function. The curved function can be a polynomial function in which the depth values are defined as a function of the X-values in the X-direction and Y-values in the Y-direction. The curved function preferably has an extremum, in particular a maximum, in the center of the captured region. An exemplary illustration of a curved function fitted to the second point cloud from FIG. 10 is illustrated in FIG. 11.

A further step 96 involves determining the second correction values on the basis of a curvature of the curved function. In other words, each second correction value is determined on the basis of a deviation of the fitted curved function relative to a horizontal plane.

A further step 98 involves correcting the segmented depth values of each point of the point grid on the basis of the first and second correction values.

A further step 100 involves determining for each point of the point grid a third correction value and a fourth correction value on the basis of a cost function L between an astigmatism model and the corrected depth values of the respective point of the point grid. A linear combination of two radially symmetrical sine functions can be used as the astigmatism model. The astigmatism model can be defined for example by the formula $\alpha \sin \theta + \beta \cos \theta$. In this case, a and R are the coefficients of the sine functions and $\theta$ is an angle in the X-Y plane around the center point of the respective point of the point grid. The cost function L is defined in accordance with equation (16).

$$L(\alpha,\beta)=\Sigma |f(r,\theta)-(\alpha \sin \theta+\beta \cos \theta)|^2 \quad (16)$$

In the cost function in this case a sum is formed over those points of the depth map which are assigned to or reproduce the corresponding point of the point grid. The position of these points in the X-Y-plane can be indicated in polar coordinates r and $\theta$ in relation to the center point of the respective point of the point grid. $f(r, \theta)$ indicates the deviation of the depth value of these points of the depth map relative to the averaged depth value of the point of the point grid. The cost function is then minimized according to the coefficients of the sine functions. The third and fourth correction values of the point of the point grid can then be determined on the basis of the minimized coefficients $\alpha$ and $\beta$. In particular, the third and fourth correction values of the point of the point grid correspond to the minimized coefficients.

A further step 102 involves interpolating the third and fourth correction values of the points of the depth map on the basis of the third and fourth correction values of each point of the point grid over the entire region. In this way, a third and fourth correction value can be assigned to each point of the depth map.

The determination of the correction values is briefly summarized again in FIG. 13. Depiction (A) shows the region of the point grid that is captured by means of the optical sensor. Depiction (B) shows a depth map of the region of the point grid without correction of the depth values. Depiction (C) shows the depth values of a segmented point of the point grid. Depiction (D) shows the depth values of the segmented point of the point grid after the first correction value and the second correction value have been determined and the depth values have been corrected on the basis of the first and second correction values. Depiction (E) shows the depth values of the segmented point of the point grid after the third correction value and the fourth correction value have been determined and the depth values have been corrected on the basis of the third and fourth correction values.

FIGS. 14-20 describe the application of the method 60 from FIG. 3 to a USAF resolution test chart, also called USAF test object, as workpiece 12. The USAF test object is a standardized test object for determining the resolving power of optical instruments.

Figure 14:
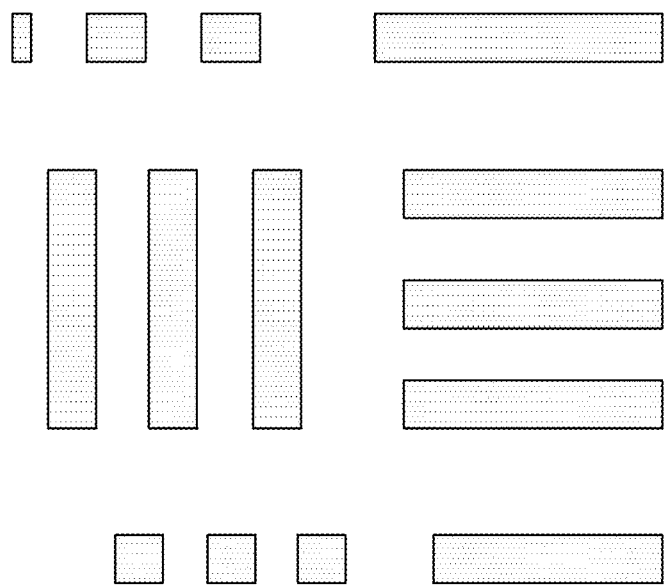
FIG. 14 shows a view of a USAF resolution test chart.

The example of the USAF resolution test chart is particularly suitable for elucidating the correction of the astigmatism aberration. The USAF resolution test chart is a flat plane with black and white areas. In particular black rectangles can be applied on a white background. An excerpt from a USAF resolution test chart is shown in FIG. 14. The astigmatism aberration occurs in particular at the transitions between black and white areas, i.e. at the edges of the rectangles.

Figure 15:
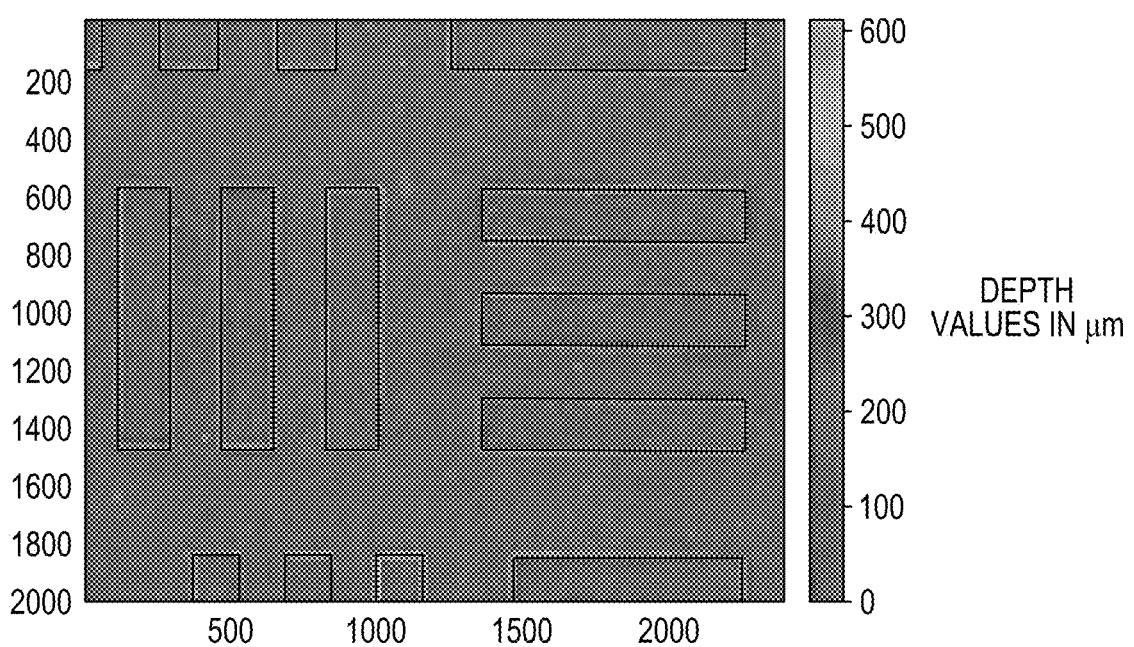
FIG. 15 shows a first view of a depth map of a USAF resolution test chart.
Figure 16:
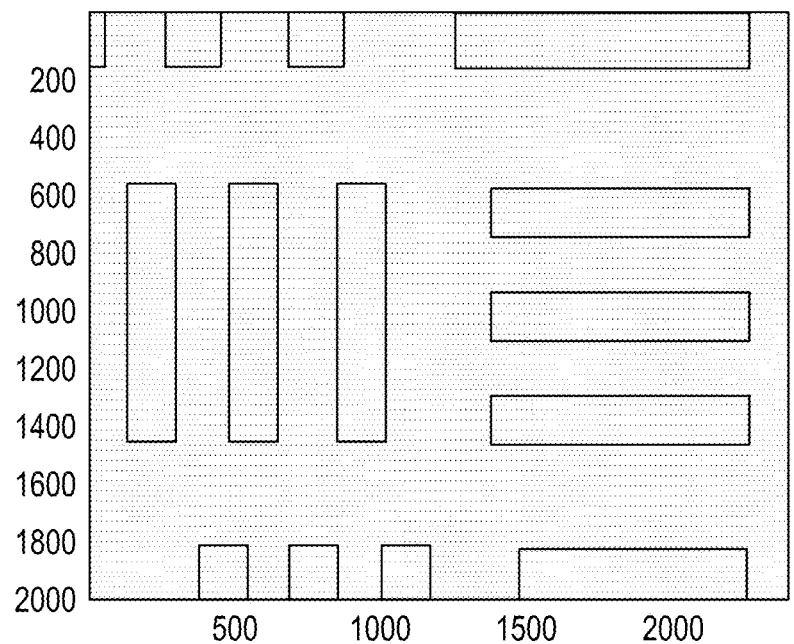
FIG. 16 shows a view of a representation of the image gradients of the USAF resolution test chart.
Figure 19:
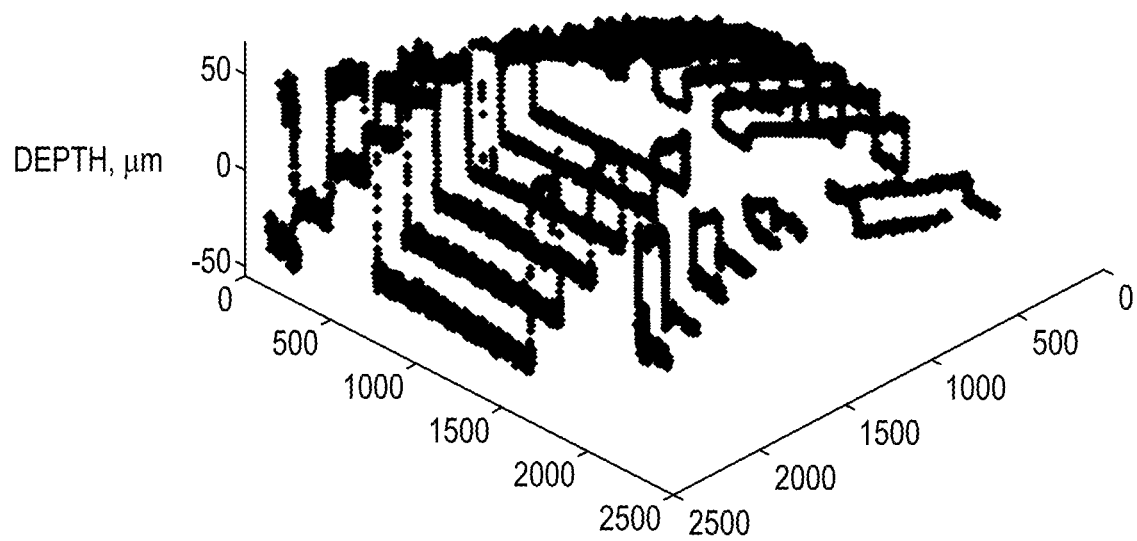
FIG. 19 shows a second view of the depth map of a USAF resolution test chart.

Firstly, for a region of the surface of the USAF resolution test chart, a depth map is generated by means of the methods from FIGS. 2 and 3. Exemplary representations in 2D and 3D views are illustrated in FIGS. 15 and 19, without correction of the astigmatism aberration. An EDOF image of the captured region of the surface of the USAF resolution test chart can then be generated on the basis of the generated depth map and the corresponding focal image stack.

Exemplary representations of the depth map in FIGS. 15 and 19 show that the depth map is flat to the greatest possible extent, with the exception of edges extending rectangularly. These edges have different depth values depending on direction. These edges extend in accordance with the edges of the rectangles of the USAF resolution test chart. The deviations of the depth values at the edges of the rectangles are a result of the astigmatism aberration. Since the real surface profile of the USAF resolution test chart is a planar surface, the edges of the rectangles must be at the same height and therefore have the same depth value.

In order to correct the astigmatism aberration, firstly a gradient map is calculated from the EDOF image or with the aid of the entire or a part of the focal image stack. The gradient map represents the image gradient for each point. The strength of the image gradient is illustrated by way of example in FIG. 16.

Figure 17:
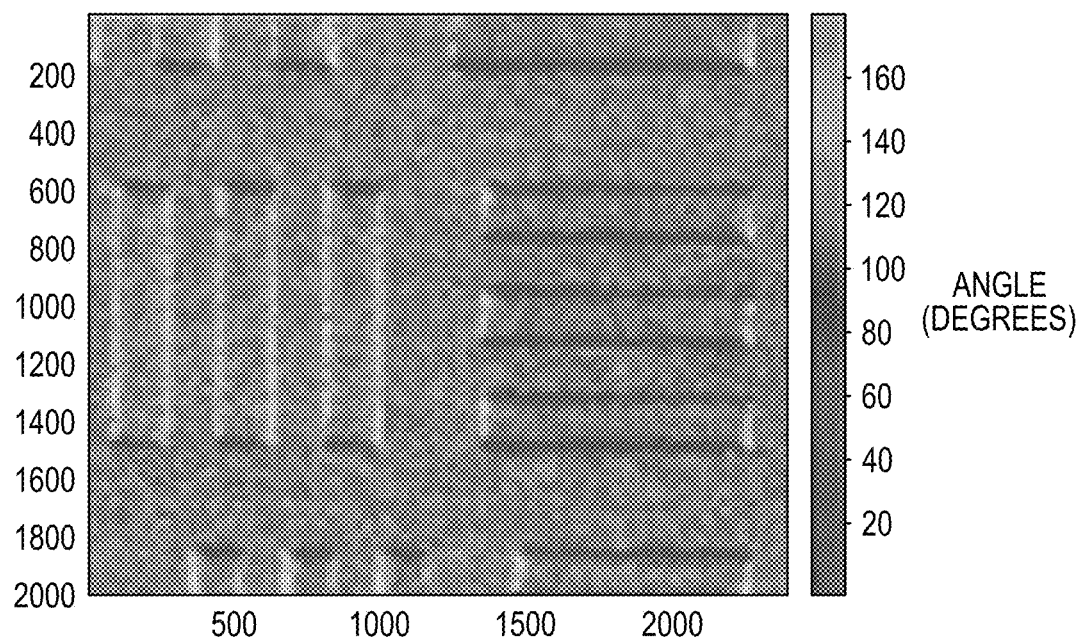
FIG. 17 shows a view of a representation of an angle map of the USAF resolution test chart.

On the basis of the image gradient, an angle of the image gradient is then determined for each point of the EDOF image, the angles determined forming an angle map. An exemplary angle map is illustrated in FIG. 17.

Figure 18:
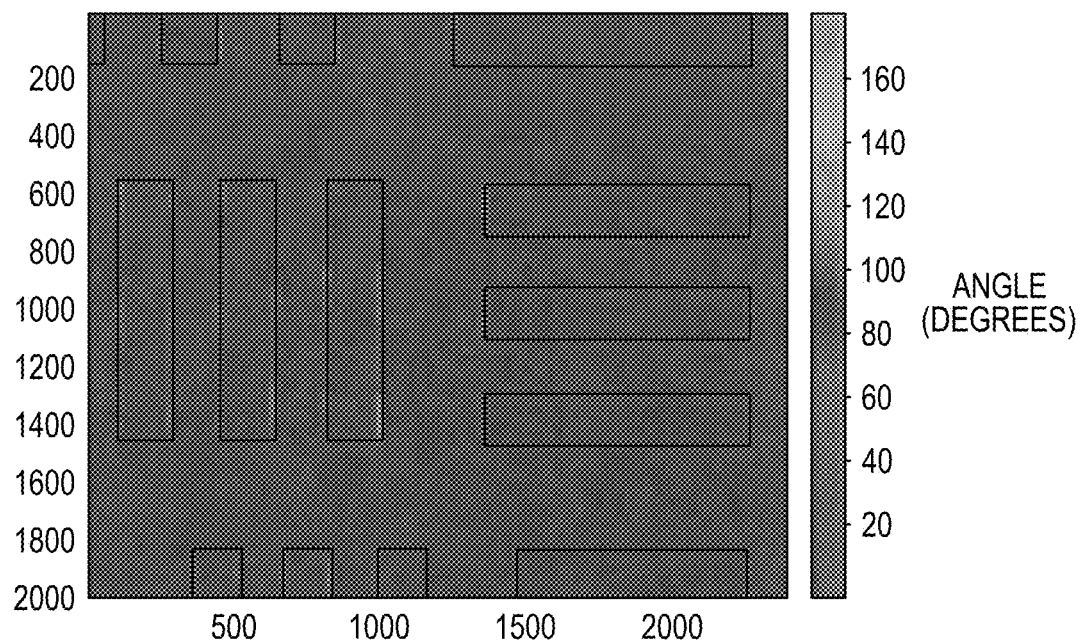
FIG. 18 shows a first view of a corrected angle map of the USAF resolution test chart.
Figure 20:
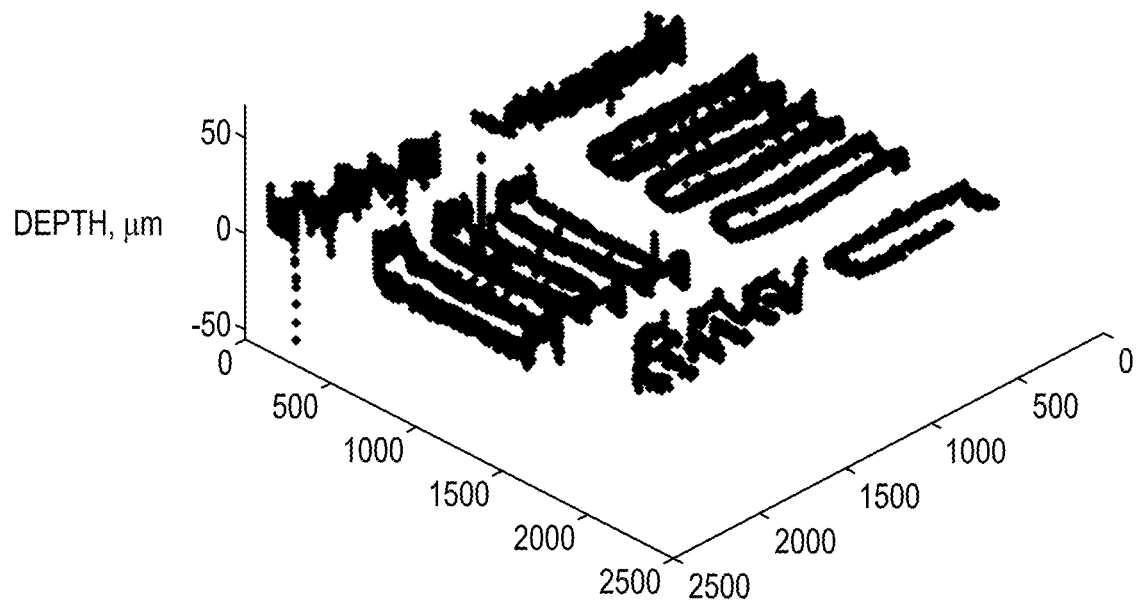
FIG. 20 shows a second view of a corrected angle map of the USAF resolution test chart.

The depth map of the USAF resolution test chart is then corrected by means of the generated depth map and also the third and fourth correction values. FIGS. 18 and 20 illustrate an exemplary corrected depth map of the USAF resolution test chart. In this case, the edges that had different depth values in FIGS. 15 and 19 have substantially identical depth values. In other words, the correction mechanism described has resulted in the edges in the depth map now being arranged at the same height in accordance with the real surface profile.

The phrase "at least one of A, B, and C" should be construed to mean a logical (A OR B OR C), using a non-exclusive logical OR, and should not be construed to mean "at least one of A, at least one of B, and at least one of C." The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The invention claimed is:

1. A computer-implemented method for generating a depth map of a region of a surface of a workpiece, the computer-implemented method comprising:
   receiving a focal image stack, wherein:
     the focal image stack includes a plurality of images of the workpiece,
     the images image the region of the surface of the workpiece with defined focal plane positions that are different in a depth direction,
     a focal plane position is assigned to each of the images, and
     image points of the images are respectively assigned to a corresponding object point on the surface of the workpiece;
   determining a focus value of each image point of each image of the focal image stack;
   fitting a function along the depth direction to the focus values of those image points of the images that are assigned to the same object point;
   determining a depth value of each object point on the surface of the workpiece in the depth direction based on an extremum of the fitted function;
   generating the depth map of the region of the surface of the workpiece based on the determined depth values;
   for each point of the depth map, determining third and fourth correction values; and
   generating a depth map of a calibration object before measuring the workpiece,
   wherein the respective correction value is determined based on a deviation of the depth map of the calibration object with respect to a known surface profile of the calibration object,
   wherein the calibration object is a point grid, and
   wherein determining the third and fourth correction values includes:
     determining a respective third correction value and a respective fourth correction value for each point of the point grid based on a cost function between an astigmatism model and the depth values of the respective point, and
     interpolating the third and fourth correction values based on the respective third and fourth correction values of each point of the point grid.

2. The computer-implemented method of claim 1 wherein:
   a depth value in the depth direction is assigned to each image of the focal image stack, and
   the depth values of the images succeed one another in discrete steps.

3. The computer-implemented method of claim 1 wherein the focus value of each image point is determined based on a sharpness of the image point.

4. The computer-implemented method of claim 1 wherein:
   the function is a Gaussian function, and
   the depth value of each object point corresponds to the expected value of the respective Gaussian function.

5. The computer-implemented method of claim 4 wherein:
   parameters of the Gaussian function are determined using a linear equation system $Ax=B$,
   A is a 3×3 matrix representing coefficients of the equation system,
   B is a vector of solutions of the equation system,
   x is a vector of the parameters of the Gaussian function that are to be determined, and
   the computer-implemented method further comprises determining the depth value based on the determined parameters.

6. The computer-implemented method of claim 5 wherein:
   the parameters are determined using $x=A^{-1}B$, and
   $A^{-1}B$ corresponds to an optimization solution of an overdetermined equation system based on the least squares method.

7. The computer-implemented method of claim 1 further comprising:
   correcting an imaging aberration of the images of the focal image stack in the depth map,
   wherein the imaging aberration includes at least one of a tilt aberration, an image field curvature aberration, and an astigmatism aberration.

8. The computer-implemented method of claim 7 further comprising correcting the tilt aberration by:
   assigning a first correction value to each point of the depth map; and
   correcting the depth value of each point of the depth map using the corresponding first correction value.

9. The computer-implemented method of claim 7 further comprising correcting the image field curvature aberration by:
    assigning a second correction value to each point of the depth map; and
    correcting the depth value of each point of the depth map using the corresponding second correction value.

10. The computer-implemented method of claim 7 further comprising correcting the astigmatism aberration by:
    generating an angle map of the region of the surface of the workpiece;
    assigning a third correction value and a fourth correction value to each point of the depth map; and
    correcting the depth value of each point of the depth map based on the third correction value, the fourth correction value, and the angle map.

11. A method comprising:
    the computer-implemented method of claim 1; and
    capturing the plurality of images of the workpiece using an optical sensor of a measuring apparatus.

12. The method of claim 11 wherein:
    the optical sensor and the workpiece are movable relative to one another in the depth direction, such that a distance in the depth direction between the workpiece and the optical sensor is variable,
    the method further comprises varying the distance between the workpiece and the optical sensor,
    the plurality of images are captured while the distance between the workpiece and the optical sensor is varied, and
    the images each image the region of the surface of the workpiece from different, defined distances with respect to the workpiece in the depth direction.

13. The method of claim 12 wherein:
    the measuring apparatus includes a drive device;
    the measuring apparatus includes a workpiece holder configured to hold the workpiece; and
    the method further comprises controlling the drive device to vary the distance between the workpiece and the optical sensor by at least one of:
        moving the optical sensor relative to the workpiece holder in the depth direction, and
        moving the workpiece holder relative to the optical sensor in the depth direction.

14. The method of claim 12 wherein the distance between the workpiece and the optical sensor is varied in discrete steps.

15. The method of claim 11 wherein:
    the measuring apparatus includes an illumination device, and
    the method further comprises illuminating the workpiece using the illumination device while capturing the plurality of images.

16. The method of claim 1 further comprising outputting the depth map using an output device.

17. A computer-implemented method for generating a depth map of a region of a surface of a workpiece, the computer-implemented method comprising:
    receiving a focal image stack, wherein:
        the focal image stack includes a plurality of images of the workpiece,
        the images image the region of the surface of the workpiece with defined focal plane positions that are different in a depth direction,
        a focal plane position is assigned to each of the images, and
        image points of the images are respectively assigned to a corresponding object point on the surface of the workpiece;
    determining a focus value of each image point of each image of the focal image stack;
    fitting a function along the depth direction to the focus values of those image points of the images that are assigned to the same object point;
    determining a depth value of each object point on the surface of the workpiece in the depth direction based on an extremum of the fitted function;
    generating the depth map of the region of the surface of the workpiece based on the determined depth values;
    for each point of the depth map, determining a first correction value; and
    generating a depth map of a calibration object before measuring the workpiece,
    wherein the respective correction value is determined based on a deviation of the depth map of the calibration object with respect to a known surface profile of the calibration object,
    wherein the calibration object is a point grid, and
    wherein determining the first correction values includes:
        generating a first point cloud of all points of the point grid based on mean values of the depth values of each individual point of the point grid
        fitting a plane through the first point cloud, and
        determining the first correction values based on a tilt angle of a normal to the plane relative to the depth direction.

18. A computer-implemented method for generating a depth map of a region of a surface of a workpiece, the computer-implemented method comprising:
    receiving a focal image stack, wherein:
        the focal image stack includes a plurality of images of the workpiece,
        the images image the region of the surface of the workpiece with defined focal plane positions that are different in a depth direction,
        a focal plane position is assigned to each of the images, and
        image points of the images are respectively assigned to a corresponding object point on the surface of the workpiece;
    determining a focus value of each image point of each image of the focal image stack;
    fitting a function along the depth direction to the focus values of those image points of the images that are assigned to the same object point;
    determining a depth value of each object point on the surface of the workpiece in the depth direction based on an extremum of the fitted function;
    generating the depth map of the region of the surface of the workpiece based on the determined depth values;
    for each point of the depth map, determining a second correction value; and
    generating a depth map of a calibration object before measuring the workpiece,
    wherein the respective correction value is determined based on a deviation of the depth map of the calibration object with respect to a known surface profile of the calibration object,
    wherein the calibration object is a point grid, and
    wherein determining the second correction values includes:

generating a second point cloud of all points of the point grid based on mean values of the depth values of each individual point of the point grid, fitting a curved function to the second point cloud, and determining the second correction values based on a curvature of the curved function.

19. A measuring apparatus for measuring a surface of a workpiece, the measuring apparatus comprising:

a workpiece holder for the workpiece;

an optical sensor configured to capture images of a region of the surface of the workpiece, wherein the optical sensor and the workpiece are spaced apart from one another in a depth direction; and a control device configured to generate a depth map of the surface of the workpiece by:

receiving a focal image stack, wherein:

the focal image stack includes the captured images, the images image a region of the surface of the workpiece with defined focal plane positions that are different in a depth direction, a focal plane position is assigned to each image of the focal image stack, and image points of the images are respectively assigned to a corresponding object point on the surface of the workpiece;

determining a focus value of each image point of each image of the focal image stack;

fitting a function along the depth direction to the focus values of those image points of the images that are assigned to the same object point;

determining a depth value of each object point on the surface of the workpiece in the depth direction based on an extremum of the fitted function; and generating a depth map of the region of the surface of the workpiece based on the determined depth values;

for each point of the depth map, determining third and fourth correction values; and generating a depth map of a calibration object before measuring the workpiece, wherein the respective correction value is determined based on a deviation of the depth map of the calibration object with respect to a known surface profile of the calibration object, wherein the calibration object is a point grid, and wherein determining the third and fourth correction values includes:

determining a respective third correction value and a respective fourth correction value for each point of the point grid based on a cost function between an astigmatism model and the depth values of the respective point, and interpolating the third and fourth correction values based on the respective third and fourth correction values of each point of the point grid.

20. The measuring apparatus of claim 19 further comprising a drive device configured to move at least one of the optical sensor and the workpiece holder relative to one another in the depth direction in order to vary a distance between the workpiece and the optical sensor.

21. The measuring apparatus of claim 20 wherein:

the control device is configured to, before generating the depth map, control the drive device in such a way that a distance between the workpiece and the optical sensor is varied;

the optical sensor is controlled in such a way that the images are captured while the distance between the workpiece and the optical sensor is varied; and the images each image the region of the surface of the workpiece from different, defined distances with respect to the workpiece in the depth direction.

22. A non-transitory computer-readable medium comprising instructions including:

receiving a focal image stack, wherein:

the focal image stack includes a plurality of images of a workpiece, the images image a region of a surface of the workpiece with defined focal plane positions that are different in a depth direction, a focal plane position is assigned to each image of the focal image stack, and image points of the images are respectively assigned to a corresponding object point on the surface of the workpiece;

determining a focus value of each image point of each image of the focal image stack;

fitting a function along the depth direction to the focus values of those image points of the images which are assigned to the same object point;

determining a depth value of each object point on the surface of the workpiece in the depth direction based on an extremum of the fitted function; and generating a depth map of the region of the surface of the workpiece based on the determined depth values;

for each point of the depth map, determining third and fourth correction values; and generating a depth map of a calibration object before measuring the workpiece, wherein the respective correction value is determined based on a deviation of the depth map of the calibration object with respect to a known surface profile of the calibration object, wherein the calibration object is a point grid, and wherein determining the third and fourth correction values includes:

determining a respective third correction value and a respective fourth correction value for each point of the point grid based on a cost function between an astigmatism model and the depth values of the respective point, and interpolating the third and fourth correction values based on the respective third and fourth correction values of each point of the point grid.

23. A measuring apparatus for measuring a surface of a workpiece, the measuring apparatus comprising:

a workpiece holder for the workpiece;

an optical sensor configured to capture images of a region of the surface of the workpiece, wherein the optical sensor and the workpiece are spaced apart from one another in a depth direction; and a control device configured to generate a depth map of the surface of the workpiece by:

receiving a focal image stack, wherein:

the focal image stack includes the captured images, the images image a region of the surface of the workpiece with defined focal plane positions that are different in a depth direction, a focal plane position is assigned to each image of the focal image stack, and image points of the images are respectively assigned to a corresponding object point on the surface of the workpiece;

determining a focus value of each image point of each image of the focal image stack;

fitting a function along the depth direction to the focus values of those image points of the images that are assigned to the same object point;
determining a depth value of each object point on the surface of the workpiece in the depth direction based on an extremum of the fitted function;
generating a depth map of the region of the surface of the workpiece based on the determined depth values,
for each point of the depth map, determining a first correction value; and
generating a depth map of a calibration object before measuring the workpiece,
wherein the respective correction value is determined based on a deviation of the depth map with respect to a known surface profile of the calibration object,
wherein the calibration object is a point grid, and
wherein determining the first correction values includes:
generating a first point cloud of all points of a point grid based on mean values of the depth values of each individual point of the point grid,
fitting a plane through the first point cloud, and
determining the first correction values based on a tilt angle of a normal to the plane relative to the depth direction.

24. A measuring apparatus for measuring a surface of a workpiece, the measuring apparatus comprising:
a workpiece holder for the workpiece;
an optical sensor configured to capture images of a region of the surface of the workpiece, wherein the optical sensor and the workpiece are spaced apart from one another in a depth direction; and
a control device configured to generate a depth map of the surface of the workpiece by:
receiving a focal image stack, wherein:
the focal image stack includes the captured images,
the images image a region of the surface of the workpiece with defined focal plane positions that are different in a depth direction,
a focal plane position is assigned to each image of the focal image stack, and
image points of the images are respectively assigned to a corresponding object point on the surface of the workpiece;
determining a focus value of each image point of each image of the focal image stack;
fitting a function along the depth direction to the focus values of those image points of the images that are assigned to the same object point;
determining a depth value of each object point on the surface of the workpiece in the depth direction based on an extremum of the fitted function;
generating a depth map of the region of the surface of the workpiece based on the determined depth values;
for each point of the depth map, determining a second correction value; and
generating a depth map of a calibration object before measuring the workpiece,
wherein the respective correction value is determined based on a deviation of the depth map with respect to a known surface profile of the calibration object,
wherein the calibration object is a point grid, and
wherein determining the second correction values includes:
generating a second point cloud of all points of the point grid based on mean values of the depth values of each individual point of the point grid,
fitting a curved function to the second point cloud, and
determining the second correction values based on a curvature of the curved function.

25. A non-transitory computer-readable medium comprising instructions including:
receiving a focal image stack, wherein:
the focal image stack includes a plurality of images of a workpiece,
the images image a region of a surface of the workpiece with defined focal plane positions that are different in a depth direction,
a focal plane position is assigned to each image of the focal image stack, and
image points of the images are respectively assigned to a corresponding object point on the surface of the workpiece;
determining a focus value of each image point of each image of the focal image stack;
fitting a function along the depth direction to the focus values of those image points of the images which are assigned to the same object point;
determining a depth value of each object point on the surface of the workpiece in the depth direction based on an extremum of the fitted function;
generating a depth map of the region of the surface of the workpiece based on the determined depth values;
for each point of the depth map, determining a first correction value; and
generating a depth map of a calibration object before measuring the workpiece,
wherein the respective correction value is determined based on a deviation of the depth map with respect to a known surface profile of the calibration object,
wherein the calibration object is a point grid, and
wherein determining the first correction values includes:
generating a first point cloud of all points of a point grid based on mean values of the depth values of each individual point of the point grid,
fitting a plane through the first point cloud, and
determining the first correction values based on a tilt angle of a normal to the plane relative to the depth direction.

26. A non-transitory computer-readable medium comprising instructions including:
receiving a focal image stack, wherein:
the focal image stack includes a plurality of images of a workpiece,
the images image a region of a surface of the workpiece with defined focal plane positions that are different in a depth direction,
a focal plane position is assigned to each image of the focal image stack, and
image points of the images are respectively assigned to a corresponding object point on the surface of the workpiece;
determining a focus value of each image point of each image of the focal image stack;
fitting a function along the depth direction to the focus values of those image points of the images which are assigned to the same object point;
determining a depth value of each object point on the surface of the workpiece in the depth direction based on an extremum of the fitted function;
generating a depth map of the region of the surface of the workpiece based on the determined depth values;

for each point of the depth map, determining a second correction value; and generating a depth map of a calibration object before measuring the workpiece, wherein the respective correction value is determined based on a deviation of the depth map with respect to a known surface profile of the calibration object, wherein the calibration object is a point grid, and wherein determining the second correction values includes:
   generating a second point cloud of all points of the point grid based on mean values of the depth values of each individual point of the point grid,
   fitting a curved function to the second point cloud, and
   determining the second correction values based on a curvature of the curved function.

* * * * *

UNITED STATES PATENT AND TRADEMARK OFFICE
CERTIFICATE OF CORRECTION

PATENT NO. : 12,333,748 B2
APPLICATION NO. : 17/709323
DATED : June 17, 2025
INVENTOR(S) : Tomas Aidukas et al.

It is certified that error appears in the above-identified patent and that said Letters Patent is hereby corrected as shown below:

In the Claims

Claim 6, Column 26, Line 51   "A-1 B" should be --$A^{-1} B$--

Claim 17, Column 28, Line 27   "grid" should be --grid,--

Claim 19, Column 29, Line 33   "function; and" should be --function;--

Signed and Sealed this
Twenty-second Day of July, 2025

Coke Morgan Stewart
*Acting Director of the United States Patent and Trademark Office*